US012753350B2

(12) United States Patent
Hommeltoft et al.

(10) Patent No.: US 12,753,350 B2
(45) Date of Patent: Oct. 6, 2026

(54) REPURPOSING FLUIDIZED CATALYTIC CRACKING (FCC) SYSTEMS TO GENERATE RENEWABLE FUEL INTERMEDIATE COMPOSITIONS

(71) Applicant: CHEVRON U.S.A. INC., San Ramon, CA (US)

(72) Inventors: Sven Ivar Hommeltoft, Pleasant Hill, CA (US); William Richard Boorujy, Livermore, CA (US); Steven Xuqi Song, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/075,599

(22) Filed: Mar. 10, 2025

(65) Prior Publication Data

US 2026/0015547 A1 Jan. 15, 2026

Related U.S. Application Data

(60) Provisional application No. 63/670,593, filed on Jul. 12, 2024.

(51) Int. Cl.
*B01D 45/16* (2006.01)
*B01J 8/00* (2006.01)
(Continued)

(52) U.S. Cl.
CPC ............ *C10G 11/182* (2013.01); *B01D 45/16* (2013.01); *B01J 8/003* (2013.01); *B01J 8/0055* (2013.01);
(Continued)

(58) Field of Classification Search
CPC ........ C10G 11/182; C10G 11/04; B01J 23/02; B01J 21/04; B01J 23/92; B01J 38/02;
(Continued)

(56) References Cited

U.S. PATENT DOCUMENTS 2,451,804 A 10/1948 Campbell et al.
2,664,336 A * 12/1953 Cornell .................. B01J 8/1836 502/41
(Continued)

FOREIGN PATENT DOCUMENTS

CN 101314748 12/2008
CN 102786966 11/2012
(Continued)

OTHER PUBLICATIONS

Zabeti et al. (Biodiesel production using alumina-supported calcium oxide: An optimization study, Fuel Processing Technology 91 (2010) 243-248) (Year: 2010).*
(Continued)

*Primary Examiner* — Youngsul Jeong
(74) *Attorney, Agent, or Firm* — Sheppard, Mullin, Richter & Hampton LLP; Jaime D. Choi

(57) ABSTRACT

A method of repurposing a fluid catalytic cracking (FCC) system originally designed for cracking vacuum gas oil (VGO) may include generating a first mixture of a renewable lipid feedstock and a particulate catalyst. The first mixture may be flowed through a riser for a sufficient time for the particulate catalyst to promote partial reaction of the renewable lipid feedstock to generate a second mixture including (i) catalyst particles to which acidic reaction intermediates are sorbed and (ii) a vapor-phase intermediate composition which is essentially acid free. The second mixture may be flowed into a reactor/stripper which is partially filled with more particulate catalyst. Within the reactor/stripper, the second mixture may be contacted with particulate catalyst for a sufficient residence time for the acidic reaction intermediates to substantially completely react to generate additional vapor-phase intermediate com-
(Continued)

position. The vapor-phase intermediate composition may be disengaged from the particulate catalyst and collected.

19 Claims, 7 Drawing Sheets

(51) Int. Cl.

| | |
|---|---|
| ***B01J 8/18*** | (2006.01) |
| ***B01J 8/26*** | (2006.01) |
| ***B01J 8/28*** | (2006.01) |
| ***B01J 21/04*** | (2006.01) |
| ***B01J 23/02*** | (2006.01) |
| ***B01J 23/92*** | (2006.01) |
| ***B01J 38/02*** | (2006.01) |
| ***C10G 11/04*** | (2006.01) |
| ***C10G 11/18*** | (2006.01) |

(52) U.S. Cl.

CPC ............... *B01J 8/1863* (2013.01); *B01J 8/26* (2013.01); *B01J 8/28* (2013.01); *B01J 21/04* (2013.01); *B01J 23/02* (2013.01); *B01J 23/92* (2013.01); *B01J 38/02* (2013.01); *C10G 11/04* (2013.01); *B01J 2208/00557* (2013.01); *B01J 2208/00752* (2013.01); *B01J 2208/00761* (2013.01)

(58) Field of Classification Search

CPC . B01J 8/26; B01J 8/1863; B01J 8/0055; B01J 8/003; B01J 8/28; B01J 2208/00557; B01J 2208/00752; B01J 2208/00761; B01D 45/16

See application file for complete search history.

(56) References Cited

U.S. PATENT DOCUMENTS

| | | | | |
|---|---|---|---|---|
| 3,433,733 | A | 3/1969 | Bunn, Jr. et al. | |
| 3,784,463 | A | 1/1974 | Reynolds et al. | |
| 3,894,936 | A | 7/1975 | Hartley | |
| 4,007,131 | A | 2/1977 | Gilespie | |
| 4,645,585 | A | 2/1987 | White | |
| 4,880,574 | A | 11/1989 | Welsh | |
| 5,145,490 | A | 9/1992 | Sadowski | |
| 6,187,465 | B1 | 2/2001 | Galloway | |
| 7,594,994 | B1 | 9/2009 | Seibert et al. | |
| 7,998,339 | B2 | 8/2011 | Myllyoja et al. | |
| 8,350,102 | B2 | 1/2013 | Roberts, IV et al. | |
| 8,354,065 | B1 | 1/2013 | Sexton et al. | |
| 9,580,657 | B2 | 2/2017 | Heydenrych et al. | |
| 9,903,584 | B2 | 2/2018 | Fan et al. | |
| 10,190,059 | B2 | 1/2019 | Chapus et al. | |
| 10,479,943 | B1 * | 11/2019 | Liu .......................... | C10G 3/42 |
| 10,947,458 | B1 | 3/2021 | Tengfei et al. | |
| 11,479,725 | B2 | 10/2022 | Amblard et al. | |
| 11,555,153 | B1 | 1/2023 | Hommeltoft | |
| 11,912,947 | B1 | 2/2024 | Hommeltoft | |
| 12,139,673 | B2 | 11/2024 | Andersson et al. | |
| 12,241,421 | B1 | 3/2025 | Minelli | |
| 12,319,878 | B2 | 6/2025 | Hommeltoft | |
| 12,319,881 | B1 | 6/2025 | Han et al. | |
| 12,421,460 | B2 | 9/2025 | Hommeltoft | |
| 12,434,224 | B2 | 10/2025 | Hommeltoft | |
| 12,582,954 | B1 | 3/2026 | Hommeltoft et al. | |
| 12,590,255 | B1 | 3/2026 | Han et al. | |
| 12,590,258 | B1 | 3/2026 | Hommeltoft et al. | |
| 12,595,425 | B2 | 4/2026 | Hommeltoft | |
| 2007/0161832 | A1 | 7/2007 | Myllyoja et al. | |
| 2008/0053870 | A1 | 3/2008 | Marker | |
| 2009/0000185 | A1 | 1/2009 | Aulich et al. | |
| 2009/0158637 | A1 | 6/2009 | McCall et al. | |
| 2009/0300970 | A1 | 12/2009 | Perego | |
| 2010/0043278 | A1 | 2/2010 | Brevoord | |
| 2010/0163395 | A1 | 7/2010 | Henrich | |
| 2011/0021857 | A1 | 1/2011 | Cao | |
| 2011/0054230 | A1 | 3/2011 | Cole et al. | |
| 2011/0056869 | A1 | 3/2011 | Novak et al. | |
| 2011/0196113 | A1 | 8/2011 | Nesterenko | |
| 2011/0237853 | A1 | 9/2011 | Hamamatsu et al. | |
| 2012/0137572 | A1 * | 6/2012 | Bartek ..................... | C10G 3/62<br>422/600 |
| 2012/0160741 | A1 | 6/2012 | Gong et al. | |
| 2012/0203042 | A1 | 8/2012 | Huber et al. | |
| 2012/0238787 | A1 | 9/2012 | Gruber et al. | |
| 2012/0244585 | A1 | 9/2012 | Kale et al. | |
| 2012/0251424 | A1 | 10/2012 | Havlik et al. | |
| 2012/0258021 | A1 | 10/2012 | Badger | |
| 2012/0316093 | A1 | 12/2012 | Zhan et al. | |
| 2013/0006028 | A1 | 1/2013 | Chaogang et al. | |
| 2013/0025187 | A1 | 1/2013 | Kocal et al. | |
| 2013/0338409 | A1 | 12/2013 | Trewalla et al. | |
| 2013/0338418 | A1 | 12/2013 | Xu | |
| 2013/0343958 | A1 | 12/2013 | Swann | |
| 2014/0012025 | A1 | 1/2014 | Sohling et al. | |
| 2014/0109464 | A1 | 4/2014 | Powell et al. | |
| 2014/0123973 | A1 | 5/2014 | North | |
| 2014/0148609 | A1 | 5/2014 | Roussis et al. | |
| 2014/0163285 | A1 | 6/2014 | Buchanan et al. | |
| 2014/0171700 | A1 | 6/2014 | Roberts | |
| 2015/0018581 | A1 | 1/2015 | Kettunen | |
| 2015/0051428 | A1 | 2/2015 | Dayton | |
| 2015/0087861 | A1 | 3/2015 | Devaux et al. | |
| 2015/0141703 | A1 | 5/2015 | Dubois | |
| 2015/0259202 | A1 | 9/2015 | Dybkj | |
| 2017/0183581 | A1 | 6/2017 | Ladkat | |
| 2018/0170824 | A1 | 6/2018 | Sreekumar | |
| 2018/0258349 | A1 | 9/2018 | Heydenrych | |
| 2019/0093035 | A1 | 3/2019 | Malatak | |
| 2019/0185759 | A1 | 6/2019 | Kanervo et al. | |
| 2019/0299195 | A1 | 10/2019 | Nakazawa | |
| 2019/0338219 | A1 | 11/2019 | White | |
| 2020/0017772 | A1 | 1/2020 | Ramamurthy | |
| 2021/0179952 | A1 | 6/2021 | Tsuto et al. | |
| 2021/0380885 | A1 | 12/2021 | Mills | |
| 2022/0041938 | A1 | 2/2022 | Hommeltoft | |
| 2022/0048833 | A1 | 2/2022 | Drobyshev | |
| 2022/0049172 | A1 | 2/2022 | Tiitta et al. | |
| 2022/0119328 | A1 | 4/2022 | Schroer | |
| 2022/0145199 | A1 | 5/2022 | Kuo | |
| 2022/0403252 | A1 | 12/2022 | Vilja et al. | |
| 2023/0098592 | A1 | 3/2023 | Novak | |
| 2023/0234843 | A1 | 7/2023 | Hobby | |
| 2023/0357106 | A1 | 11/2023 | Missalla et al. | |
| 2024/0018419 | A1 | 1/2024 | Huizenga | |
| 2024/0157320 | A1 | 5/2024 | Song et al. | |
| 2024/0157347 | A1 | 5/2024 | Hommeltoft | |
| 2024/0218261 | A1 | 7/2024 | Hommeltoft | |
| 2024/0253028 | A1 | 8/2024 | Zhang | |
| 2024/0425764 | A1 | 12/2024 | Hommeltoft | |
| 2025/0027000 | A1 | 1/2025 | Hommeltoft | |
| 2025/0333656 | A1 | 10/2025 | Hommeltoft | |
| 2026/0008023 | A1 | 1/2026 | Hommeltoft | |

FOREIGN PATENT DOCUMENTS

| | | | | |
|---|---|---|---|---|
| CN | 105983377 | | 7/2020 | |
| EP | 2141217 | B1 | 3/2015 | |
| EP | 4372069 | | 5/2024 | |
| FI | 20205954 | A1 | 3/2022 | |
| FI | 20225933 | A1 | 4/2024 | |
| FR | 2991596 | A1 | 12/2013 | |
| WO | 2008/152199 | | 12/2008 | |
| WO | 2009/130392 | | 10/2009 | |
| WO | 2010071677 | | 6/2010 | |
| WO | 2014/089131 | | 6/2014 | |
| WO | 2015/148412 | | 10/2015 | |
| WO | WO-2022221840 | A1 * | 10/2022 | ............ C10G 65/00 |
| WO | 2023/066738 | | 4/2023 | |

(56) References Cited

FOREIGN PATENT DOCUMENTS

| | | |
|---|---|---|
| WO | 2023088722 | 5/2023 |
| WO | 2024006239 | 1/2024 |

OTHER PUBLICATIONS

Thangadurai et al. (Acidity and basicity of metal oxide based catalysts in catalytic cracking of vegetable oil, Brazilian Journal of Chemical Engineering (2021) 38:1-20) (Year: 2021).*

Gibon et al., "Palm oil refining," Eur. J. Lipid. Sci. Technol. 109 (2007), 315-335.

Glowka et al., "Sustainable aviation fuel—Comprehensive study on highly selective isomerization route towards HEFA based bioadditives," Renewable Energy 220 (2024), 9 pages.

Mu et al., "Optimum design of radial flow moving-bed reactors based on a mathematical hydrodynamic model," Chemical Engineering and Processing 42 (2003), pp. 409-417.

Renz, "Ketonization of Carboxylic Acids by Decarbooxylation: Mechanism and Scope," Eur. J. Org. Chem. 2005, 979-988.

Shirzad et al., "Moving Bed Reactors: Challenges and Progress of Experimental and Theoretical Studies in a Century of Research," Ind. Eng. Chem. Res. 58 (2019), pp. 9179-9198.

Chen et al., "Catalytic fast pyrolysis of biomass: Selective deoxygenation to balance the quality and yield of bio-oil," Bioresource Technol., 273, pp. 153-158, 2019.

Chen et al., "Recent developments in ignocellulosic biomass catalytic fast pyrolysis: Strategies for the optimization of bio-oil quality and yield," Fuel Process Technol., 196, 106180, 2019.

Han et al., Advancing the application of bio-oils by co-processing with petroleum intermediates: A review, Energy Conversion and Management, 2021.

Liang et al., "Catalytic fast pyrolysis of lignocellulosic biomass: Critical role of zeolite catalysts," Renew. Sust. Energ. Rev., 139, 110707, 2021.

Zabeti et al., "Biodiesel production using alumina-supported calcium-oxide: An optimization study," Fuel Processing Technology 91 (2010) 243-248.

Zhang et al., "Superheated steam as carrier gas and the sole heat source to enhance biomass torrefaction," Bioresource Technology, 2021.

Zhou et al., "Catalytic conversion of lignocellulosic biomass to fine chemicals and fuels," Chem. Soc. Rev. 40, pp. 5588-5617, 2011.

Li et al., "Applications of calcium oxide-based catalyst in biomass pyrolysis/gasification—A review," Journal of Cleaner Production, 291, pp. 1-12, 2021.

King, "Engineering of Fluidized Catalytic Crackers," H.I. de lasa et al. ( eds.), Chemical Reactor Technology for Environmentally Safe Reactors and Products, 1993, pp. 17-50.

Mansir et al., "Catalytically active metal oxides studies for the conversion technology of carboxylic acids and bioresource based fatty acids to ketones: A review," Bioresource Technology Reports 17 (2022) 100988.

Huber et al., "Synthesis of Transportation Fuels from Biomass: Chemistry, Catalysts, and Engineering," Chem. Rev. (2006), 106, 4044-4098.

ASTM International "D7566-24c Standard Specification for Aviation Turbine Fuel Containing Synthesized Hydrocarbons" Last updated Oct. 2024. pp. 1-41.

* cited by examiner

REPURPOSING FLUIDIZED CATALYTIC CRACKING (FCC) SYSTEMS TO GENERATE RENEWABLE FUEL INTERMEDIATE COMPOSITIONS

CROSS-REFERENCE TO RELATED APPLICATIONS

This application claims the benefit of U.S. Provisional Patent Application No. 63/670,593, filed Jul. 12, 2024 and entitled "REPURPOSING FLUIDIZED CATALYTIC CRACKING (FCC) SYSTEMS TO GENERATE RENEWABLE FUEL INTERMEDIATE COMPOSITIONS," the entire contents of which are incorporated by reference herein.

FIELD

This application generally relates to renewable fuels.

BACKGROUND

There is an increasing interest in using lipid feedstocks, such as derived from plants, algae, animals, or microbiological organisms, to generate renewable fuels to replace or supplement fossil fuels. However, it can be expensive and complicated to build new systems for generating renewable fuels using lipid feedstocks.

SUMMARY

Methods and systems for repurposing fluidized catalytic cracking (FCC) systems to generate renewable fuel intermediate compositions are provided herein.

Some examples herein provide a method of repurposing a fluid catalytic cracking (FCC) system originally designed for cracking vacuum gas oil (VGO). The method may include generating a first mixture of a renewable lipid feedstock and a particulate catalyst. The method may include flowing the first mixture through a riser for a sufficient time for the particulate catalyst to promote reactions of the renewable lipid feedstock to generate a second mixture. The second mixture may include (i) catalyst particles to which acidic reaction intermediates are sorbed and (ii) a vapor-phase intermediate composition which is essentially acid free. The method may include flowing the second mixture from the riser into a reactor/stripper which is partially filled with more of the particulate catalyst. The method may include, within the reactor/stripper, contacting the second mixture with the particulate catalyst for a sufficient residence time for the particulate catalyst to promote reactions, to substantial completeness, of the acidic reaction intermediates in the second mixture to generate additional vapor-phase intermediate composition which is essentially acid free. The method may include, within the reactor/stripper, disengaging the vapor-phase intermediate composition from the particulate catalyst. The method may include collecting the disengaged vapor-phase intermediate composition. The method may include regenerating some or all of the particulate catalyst. The method may include recycling the regenerated particulate catalyst into contact with additional renewable lipid feedstock in the riser.

In some examples, the disengaging of the vapor-phase intermediate composition from the particulate catalyst is accomplished using one or more cyclones.

In some examples, the acidic reaction intermediates in the second mixture include fatty acids, carboxylates, or a mixture of fatty acids and carboxylates.

In some examples, the vapor-phase intermediate composition has a total acid number (TAN) of less than about 5.

In some examples, the acidic reaction intermediates in the second mixture are sorbed to the particulate catalyst via one or more of adsorption, chemisorption, and absorption.

In some examples, the first mixture is flowed through the riser at a rate of about 6 feet/second to about 10 feet/second.

In some examples, the first mixture is flowed through the riser for about 8 seconds to about 20 seconds.

In some examples, the vapor-phase intermediate composition includes ketone groups. In some examples, more than about 70 wt % of oxygen in the vapor-phase intermediate composition is in the ketone groups.

In some examples, the reactor/stripper, the particulate catalyst of the second mixture and with the particulate catalyst partially filling the reactor/stripper promote the reactions of the acidic reaction intermediates.

In some examples, the residence time is about 6 minutes to about 16 minutes.

In some examples, the particulate catalyst partially filling the reactor/stripper is located within a fluidized bed.

In some examples, the second mixture is flowed from the riser into the reactor/stripper at a location which is above the fluidized bed of the particulate catalyst.

In some examples, the catalyst particles to which the acidic reaction intermediates are sorbed fall onto the fluidized bed of the particulate catalyst.

In some examples, the second mixture is flowed from the riser into the reactor/stripper at a location which is within the fluidized bed of the particulate catalyst.

In some examples, the catalyst particles to which the acidic reaction intermediates are sorbed are distributed through the fluidized bed of the particulate catalyst.

In some examples, the riser and reactor/stripper are side-by-side. In some examples, the riser includes a downturned outlet.

In some examples, the reactor/stripper is stacked above the riser. In some examples, the riser is shortened relative to the original riser in the FCC.

In some examples, the particulate catalyst includes a metal oxide catalyst on an oxide support. In some examples, the metal oxide catalyst includes at least one metal selected from the group consisting of Na, K, Mg, Ca, and Sr. In some examples, the metal oxide catalyst includes calcium oxide. In some examples, the oxide support includes alumina.

Some examples herein provide a repurposed FCC system originally designed for cracking VGO. The system may include a riser configured to flow a first mixture of a renewable lipid feedstock and a particulate catalyst for a sufficient time for the particulate catalyst to promote reactions of the renewable lipid feedstock to generate a second mixture. The second mixture may include (i) catalyst particles to which acidic reaction intermediates are sorbed and (ii) a vapor-phase intermediate composition which is essentially acid free. The system may include a reactor/stripper which is partially filled with more of the particulate catalyst and configured to receive the second mixture from the riser. The reactor/stripper may be configured to contact the second mixture with the particulate catalyst for a sufficient residence time for the particulate catalyst to promote reactions, to substantial completeness, of the acidic reaction intermediates in the second mixture to generate additional vapor-phase intermediate composition which is essentially acid free. The reactor/stripper further may be configured to disengage the vapor-phase intermediate composition from the particulate catalyst. The system may include a regenerator to regenerate some or all of the particulate catalyst. The system may include piping to recycle the regenerated particulate catalyst into contact with additional renewable lipid feedstock in the riser.

In some examples, the reactor/stripper includes one or more cyclones to disengage the vapor-phase intermediate composition from the particulate catalyst.

In some examples, the acidic reaction intermediates in the second mixture include fatty acids, carboxylates, or a mixture of fatty acids and carboxylates.

In some examples, the vapor-phase intermediate composition has a total acid number (TAN) of less than about 5.

In some examples, the acidic reaction intermediates in the second mixture are sorbed to the particulate catalyst via one or more of adsorption, chemisorption, and absorption.

In some examples, the first mixture is flowed through the riser at a rate of about 6 feet/second to about 10 feet/second.

In some examples, the first mixture is flowed through the riser for about 8 seconds to about 20 seconds.

In some examples, the vapor-phase intermediate composition includes ketone groups. In some examples, more than about 70 wt % of oxygen in the vapor-phase intermediate composition is in the ketone groups.

In some examples, within the reactor/stripper, the particulate catalyst of the second mixture and with the particulate catalyst partially filling the reactor/stripper promote the reactions of the acidic reaction intermediates.

In some examples, the residence time is about 6 minutes to about 16 minutes.

In some examples, the particulate catalyst partially filling the reactor/stripper is located within a fluidized bed.

In some examples, the second mixture is flowed from the riser into the reactor/stripper at a location which is above the fluidized bed of the particulate catalyst.

In some examples, the catalyst particles to which the acidic reaction intermediates are sorbed fall onto the fluidized bed of the particulate catalyst.

In some examples, the second mixture is flowed from the riser into the reactor/stripper at a location which is within the fluidized bed of the particulate catalyst.

In some examples, the catalyst particles to which the acidic reaction intermediates are sorbed are distributed through the fluidized bed of the particulate catalyst.

In some examples, the riser and reactor/stripper are side-by-side. In some examples, the riser includes a downturned outlet.

In some examples, the reactor/stripper is stacked above the riser. In some examples, the riser is shortened relative to the original riser in the FCC.

In some examples, the particulate catalyst includes a metal oxide catalyst on an oxide support. In some examples, the metal oxide catalyst includes at least one metal selected from the group consisting of Na, K, Mg, Ca, and Sr. In some examples, the metal oxide catalyst includes calcium oxide. In some examples, the oxide support includes alumina.

DETAILED DESCRIPTION

Figure 1:
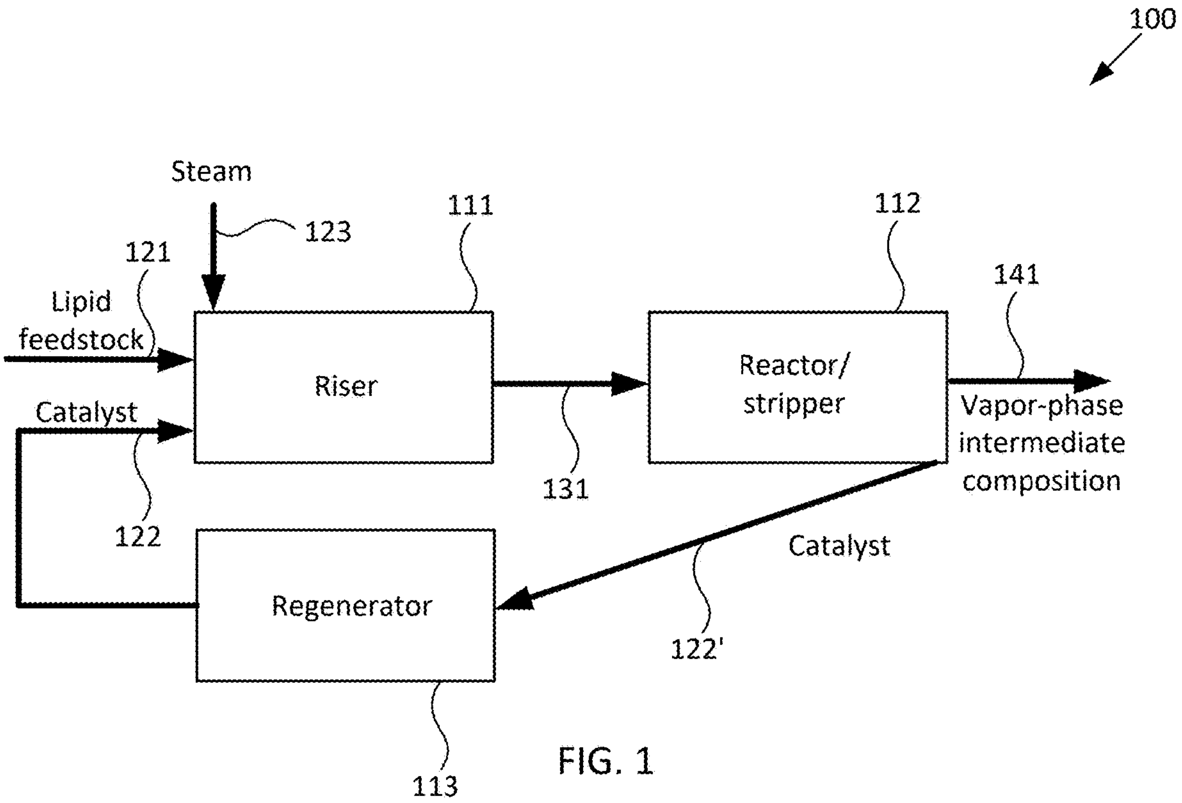
FIG. 1 schematically illustrates an example system for generating a renewable fuel intermediate composition.

A variety of renewable lipid feedstocks may be used to generate renewable fuels, such as sustainable aviation fuel (SAF) or renewable diesel. However, it can be expensive and complicated to build new systems for generating renewable fuels using lipid feedstocks. In comparison, many petroleum refineries include fluid catalytic cracking (FCC) systems which were built to hydrocrack vacuum gas oil (VGO) into transportation fuel, such as naphtha. However, in recent years, the market for petroleum-based transportation fuels has been stagnant or declining, and as such, the need for FCC systems for their original purpose is stagnant or declining. As provided herein, the present inventors have recognized that previously existing FCC systems may be repurposed for use in generating renewable fuels using lipid feedstocks. In particular, and as described in greater detail below, certain components of a previously existing FCC system may be replaced or altered to provide sufficient residence time between a lipid feedstock and a catalyst which is used to catalytically convert the lipid feedstock into an intermediate composition which is suitable for further processing into a renewable fuel, such as SAF, renewable diesel, naphtha, or gasoline. Because lipid feedstocks are chemically complex, the residence time between the lipid feedstock with the catalyst may be significantly longer (indeed, potentially at least an order of magnitude longer) than the residence time between VGO and a hydrocracking catalyst that the originally configured FCC system was originally designed to use. As recognized by the present inventors, repurposing the FCC system to generate intermediate compositions from lipid feedstocks can save significant effort and expense as compared to building a new system from scratch, can reduce waste of the materials and effort that were used to build the FCC system for its original purpose which is no longer required—the hydrocracking of VGO—and thus further facilitate and economically motivate the production of renewable fuels.

First, some example terms will be explained. Then, non-limiting examples of the present methods and systems will be described.

Example Terms

As used herein, the term “about” is intended to mean within 10% of the stated value.

As used herein, the term “primarily” is intended to mean a majority, e.g., at least half. Illustratively, a composition which primarily has components with boiling point above a certain level, means that at least half of the composition is made up of components with boiling point about that level. The term “primarily” encompasses all ranges from at least a half to 100%, e.g., 51% or more, about 60% or more, about 70% or more, about 80% or more, about 90% or more, or about 95% or more, or about 98% of more, or about 99% or more, or about 100%.

As used herein, the term "substantially" is intended to mean significantly. Illustratively, a concentration of a component within a first composition which is substantially less than the concentration of that component within a second composition, means that the concentration of that component within the first composition is less than about 20% of the concentration within the second composition, e.g., less than about 10%, less than about 5%, less than 1%, or even less. As another example, a reaction that is performed using substantially only certain components means that of all the components which are present at the reaction, at least about 80%, at least about 90%, at least about 95%, at least about 98%, at least about 99%, or about 100% are the certain components.

As used herein, the term "lipid" is intended to refer to a fatty acid; glyceride (e.g., monoglyceride or diglyceride); glycerolipid (e.g., triglyceride, also referred to as triacylglycerol, TAG, or neutral fat); phospholipid; or phosphoglyceride (also known as glycerophospholipid).

As used herein, the term "fatty acid" is intended to refer to a monocarboxylic acid having an aliphatic chain containing about 3 to 39 carbon atoms, illustratively about 7 to 23 carbon atoms. The aliphatic chain may be linear or branched, and may be saturated (e.g., may contain no carbon-carbon double bonds) or may be unsaturated (e.g., may contain one or more carbon-carbon double bonds).

As used herein, a "lipid feedstock" is intended to refer to a composition which is derived from a biological source, rather than from a fossil fuel source such as crude oil, shale oil, or coal, and primarily contains lipids. For example, a lipid feedstock may contain more than 50 wt % lipids, may contain more than 70 wt % lipids, may contain more than 85 wt % lipids, may contain more than 90 wt % lipids, may contain more than 95 wt % lipids, or more. A lipid feedstock may be derived from a plant, algae, animal, or microbiological organism. In some examples, a lipid feedstock may be derived from a low value waste material, side stream, by-product, residue, or sewage sludge. A lipid feedstock may be pretreated in a manner such as known in the art, for example, may be degummed, neutralized, bleached, and/or deodorized.

Depending on the source and the pretreatment (if any), a lipid feedstock may contain a mixture of different lipids. Illustratively, a lipid feedstock may include about 0-90 weight percent (wt %) of free fatty acids, about 5-100 wt % of fatty acid glycerol esters (e.g., monoglycerides, diglycerides, and/or triglycerides), and about 0-20 wt % of one or more compounds selected from the group consisting of: fatty acid esters of the non-glycerol type, fatty amides, and fatty alcohols. In some examples, the lipid feedstock may include more than about 50 wt % of free fatty acids and fatty acid glycerol esters, e.g., more than about 70 wt % of free fatty acids and fatty acid glycerol esters, or more than about 80 wt % of free fatty acids and fatty acid glycerol esters. The concentration of free fatty acids in a lipid feedstock may be characterized by determining the total acid number (TAN) of the feedstock, by measuring the mass of potassium hydroxide (KOH) in milligrams that is required to neutralize one gram of the lipid feedstock; see also ASTM D664. In some examples, a lipid feedstock may have a TAN of at least about 5 mg KOH/g, e.g., about 5-150 mg KOH/g, or about 10-150 mg KOH/g, or about 10-100 mg KOH/g, or about 10-50 mg KOH/g, or about 10-25 mg KOH/g, or about 10-20 mg KOH/g. A lipid feedstock may contain one or more impurities, such as phosphorous, silicon, chloride, an alkali metal such as sodium or potassium, an alkaline earth metal such as magnesium or calcium, a metal such as manganese or iron, or the like.

As used herein, the terms "renewable fuel intermediate composition" and "intermediate composition" are intended to refer to a liquid product that is produced from a lipid feedstock using a thermochemical process, and that may be further processed to generate a renewable fuel. In some examples, the intermediate compositions provided herein may include less than about 70 wt % of an amount of oxygen in the lipid feedstock. An intermediate composition may include oxygenated hydrocarbons such as carboxylic acids, alcohols, ketones, aldehydes, and the like. In some examples, about 10 wt % to 50 wt % of the molecules of a liquid portion of the intermediate composition includes oxygen, and about 50 wt % or more of the molecules of the liquid portion of the intermediate composition do not include oxygen. In some examples, at least about 80 wt % of the oxygen in the liquid portion of the intermediate composition is within ketone groups.

As used herein, the term "pyrolysis" is intended to refer to the thermal decomposition of organic materials in an oxygen-lean atmosphere (that is, an atmosphere containing significantly less oxygen than required for complete combustion).

As used herein, the term "hydroprocessing" is intended to refer to a process in which a composition (such as a lipid feedstock or an intermediate composition) is reacted with hydrogen in the presence of a catalyst under suitable conditions, e.g., elevated temperature and/or elevated pressure. Nonlimiting examples of hydroprocessing include hydrogenation, double bond saturation, hydrodeoxygenation, hydrocracking, hydro-isomerization, hydrodesulfurization, hydrodenitrogenation, hydrodearomatization, hydrodewaxing, and mild hydrocracking.

As used herein, the term "transportation fuel" refers to a fraction, cut, or blend of hydrocarbons having a distillation curve which is standardized for a particular fuel used in the transportation industry. For example, diesel fuel corresponds to a middle distillate from 160° C. to 380° C. (according to EN 590). As another example, aviation fuel corresponds to a distillate from 160° C. to 300° C. (according to ASTM D-1655). Gasoline and naphtha are other standardized, well-characterized forms of transportation fuels. When a transportation fuel is derived from a lipid feedstock (e.g., via an intermediate composition in a manner such as provided herein), then the transportation fuel may be referred to herein as a "renewable fuel." When a fuel (such as a transportation fuel, e.g., renewable fuel) is ready for use without substantial further processing, it may be referred to herein as a "final product." The final product may be conveyed to a site of use in any suitable manner, e.g., by pipeline, truck, and/or rail.

As used herein, the term "ppm" is intended to refer to parts-per-million and is a weight-relative parameter. A ppm is a microgram per gram, such that a component that is present at 10 ppm in a composition is present at 10 micrograms of the component per 1 gram of the composition.

Repurposing Fluidized Catalytic Cracking (FCC) Systems to Generate Renewable Fuel Intermediate Compositions As noted further above, conventional FCC systems were originally designed for hydrocracking VGO—a product of petroleum distillation—into transportation fuels such as naphtha. The present inventors have discovered that such FCC systems may be repurposed for use in converting lipid feedstocks into intermediate compositions which are suitable for conversion into fuel, e.g., transportation fuel such as diesel fuel aviation fuel, naphtha, and/or gasoline.

FIG. 1 schematically illustrates an example system 100 for generating a renewable fuel intermediate composition. System 100 may include riser 111, reactor/stripper 112, and regenerator 113. Riser 111 may be configured to receive a renewable lipid feedstock, e.g., via piping 121, and a particulate catalyst, e.g., via piping 122. In nonlimiting examples such as illustrated in FIG. 1, the renewable lipid feedstock and the particulate catalyst may be input into riser 111 independently from one another (e.g., via respective piping 121 and 122) and mixed with one another within riser 111 to form a first mixture therein. In other nonlimiting examples (not specifically illustrated), the renewable lipid feedstock and particulate catalyst may be mixed with one another outside of riser 111 to form a first mixture that is then input into riser 111 via suitable piping. In some examples, the first mixture within riser 111 also includes steam as an additional input to the riser, e.g., via piping 123 which may be coupled to a second inlet of riser 111 as shown in FIG. 1, or which may be coupled to piping 121 or piping 122 (not specifically illustrated). The steam may inhibit cracking and coke formation. In some examples, the steam is provided in an amount of about 0 wt % to about 50 wt %, and its use is optional. Some examples use substantially only steam and the lipid feedstock as inputs to system 100 for reactions which are catalyzed by the particulate catalyst (which catalyst may be recycled in the system in a manner such as described further below). That is, hydrogen may not be separately input to riser 111. Additionally, the steam may not be a reactant in the reactions between the lipid feedstock and the particulate catalyst, e.g., may not be a source of hydrogen for such reactions.

Riser 111 illustrated in FIG. 1 may be configured to flow the first mixture of the renewable lipid feedstock and the particulate catalyst for a sufficient time for the particulate catalyst to promote reactions of the renewable lipid feedstock to generate a second mixture that includes (i) catalyst particles to which acidic reaction intermediates are sorbed and (ii) a vapor-phase intermediate composition which is essentially acid free. In some examples, the vapor-phase intermediate composition has a total acid number (TAN) of about 5 mg KOH/g or less, e.g., a TAN of about 1 mg KOH/g or less, e.g., a TAN of about 0.5 mg KOH/g or less. Lowering the TAN of the vapor-phase intermediate composition is helpful because it simplifies the steps and equipment needed to convert the vapor-phase intermediate composition into a renewable fuel. Nonlimiting example configurations of riser 111 are described with reference to FIGS. 4 and 5.

As the first mixture flows through riser 111, the feedstock undergoes reactions promoted by the catalyst to form the second mixture. As such, a concentration of the first mixture within riser 111 may be considered to decrease along the length of riser 111 as reactions between the particulate catalyst and the renewable lipid feedstock form acidic reaction intermediates that sorb to the catalyst particles. Additionally, a concentration of the second mixture within riser 111 may be considered to increase along the length of riser as reactions between the particulate catalyst, the renewable lipid feedstock, and the acidic reaction intermediates form the intermediate composition. Because the intermediate composition is in the vapor phase, the intermediate composition desorbs from the particulate catalyst and is carried through riser 111. The vapor-phase intermediate composition may carry the particulate catalyst, at least some of which has acidic reaction intermediates sorbed thereto, through and out of riser 111. Additionally, or alternatively, steam or a non-reactive carrier gas (such as nitrogen or carbon dioxide) may be used to carry the particulate catalyst, at least some of which has acidic reaction intermediates sorbed thereto, through and out of riser 111.

Reactor/stripper 112 illustrated in FIG. 1 may be partially filled with more of the particulate catalyst and configured to receive the second mixture from the riser 111. In some examples, such as will be described with reference to FIGS. 4 and 5, the outlet of riser 111 may be disposed within reactor/stripper 112 such that riser 111 disposes the second mixture directly into the cavity of reactor/stripper. In other examples, the outlet of riser 111 may be coupled directly to an inlet of reactor/stripper 112, without any intervening piping. In still other examples, an outlet of riser 111 may be coupled to piping 131 which is coupled to an inlet of reactor/stripper 112 in a manner such as illustrated in FIG. 1. Reactor/stripper 112 may be configured to contact the second mixture with the particulate catalyst for a sufficient residence time for the particulate catalyst to promote reactions, to substantial completeness, of the acidic reaction intermediates in the second mixture to generate additional vapor-phase intermediate composition which is essentially acid free. The reactor/stripper 112 further may be configured to disengage the vapor-phase intermediate composition from the particulate catalyst. Nonlimiting example configurations of reactor/stripper 112 are described with reference to FIGS. 4 and 5.

Regenerator 113 may be configured to regenerate some or all of the particulate catalyst. For example, as illustrated in FIG. 1, system 100 may include piping 122' to feed used catalyst from reactor/stripper 112 to an input of regenerator 113, and piping 122 to feed regenerated catalyst from an output of regenerator 113 into riser 111. Note that the used catalyst need not be fully exhausted, e.g., may be only partially exhausted, by the reactions within reactor/stripper 112 before being regenerated using regenerator 113. System 100 also may include piping 122 to recycle the regenerated particulate catalyst into contact with additional renewable lipid feedstock in the riser. As such, fresh particulate catalyst need not always (or ever) be input to riser 111, and instead the particulate catalyst used in the first mixture within riser 111 may be or include regenerated catalyst from regenerator 113.

Without wishing to be bound by any theory, it is believed that the conversion of lipid feedstock to a vapor-phase intermediate composition using a particulate catalyst may involve multiple chemical operations, e.g., at least three chemical operations, which together take significantly longer to complete than hydrocracking of VGO in a conventional FCC. In some examples, the chemical operations to convert a lipid feedstock to a vapor-phase intermediate composition using a particulate catalyst may include initial cracking of the lipid feedstock, using the particulate catalyst, to form fatty acids. Additionally, in some examples, the chemical operations may include sorption of the fatty acids to the surface of the particulate catalyst. Nonlimiting examples of sorption processes of the fatty acids (and/or other reaction intermediates) include adsorption, chemisorption, and absorption. Illustratively, at least some of the fatty acids may chemisorb to the particulate catalyst via formation of carboxylate bonds using surface-bound hydroxyl groups of the particulate, for example in a manner such as illustrated below:

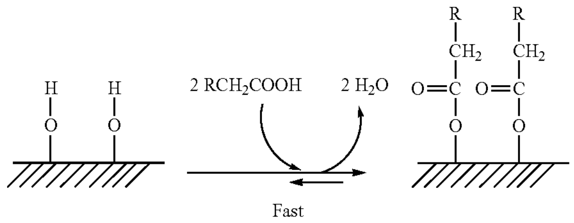

The fatty acids may undergo further chemical reactions after being sorbed to the catalyst. As such, the catalyst may have sorbed thereto various acidic reaction intermediates such as fatty acids, carboxylates, or a mixture of fatty acids and carboxylates. Illustratively, the chemical operations may include coupling of the sorbed fatty acids to one another on the surface of the particulate catalyst to form dimeric ketones which are vapor-phase molecules. Without wishing to be bound by any theory, it is believed that the sorption of fatty acids to the surface of the particulate catalyst and the chemical conversion of the fatty acids to form ketones affects the acidity and TAN of the intermediate composition. In some examples, the chemical operations may include desorption of the dimeric ketones from the particulate catalyst and into the vapor phase.

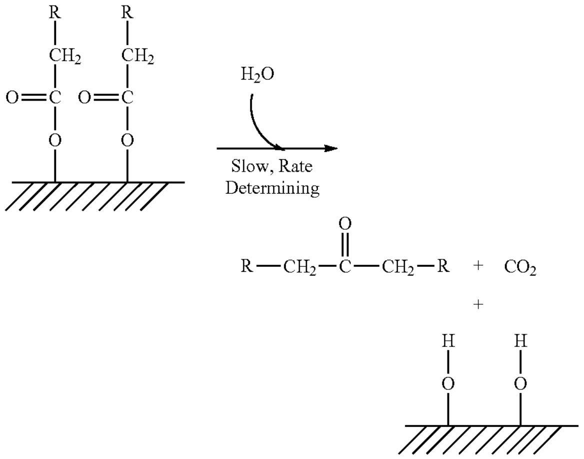

Additionally, in some examples, the chemical operations may include cracking of the vapor-phase ketones, using the particulate catalyst, into vapor-phase lighter products. Accordingly, the intermediate composition may include vapor-phase ketones, vapor-phase lighter products generated by cracking vapor-phase ketones, or a mixture of such vapor-phase ketones and vapor-phase lighter products. In some examples, more than about 70 wt % of oxygen in the vapor-phase intermediate composition is in the ketone groups.

Referring again to FIG. 1, reactor/stripper 112 may be configured to disengage the vapor-phase intermediate composition from the particulate catalyst (e.g., may include one or more cyclones), regenerator 113 may be configured to regenerate some or all of the particulate catalyst, and piping 122 may be configured to recycle the regenerated particulate catalyst into contact with additional renewable lipid feedstock in the riser.

As recognized by the present inventors, conventional FCC systems may be modified so as to conduct chemical operations such as described above, thus significantly reducing the economic burden and complexity of converting lipid feedstocks to intermediate compositions. To facilitate an understanding of how to modify a conventional FCC system to generate an intermediate composition, example features of unmodified, conventional FCC systems will be briefly described with reference to FIGS. 2 and 3. These and other features of conventional FCC systems will be familiar to those of ordinary skill in the relevant art.

Figure 2:
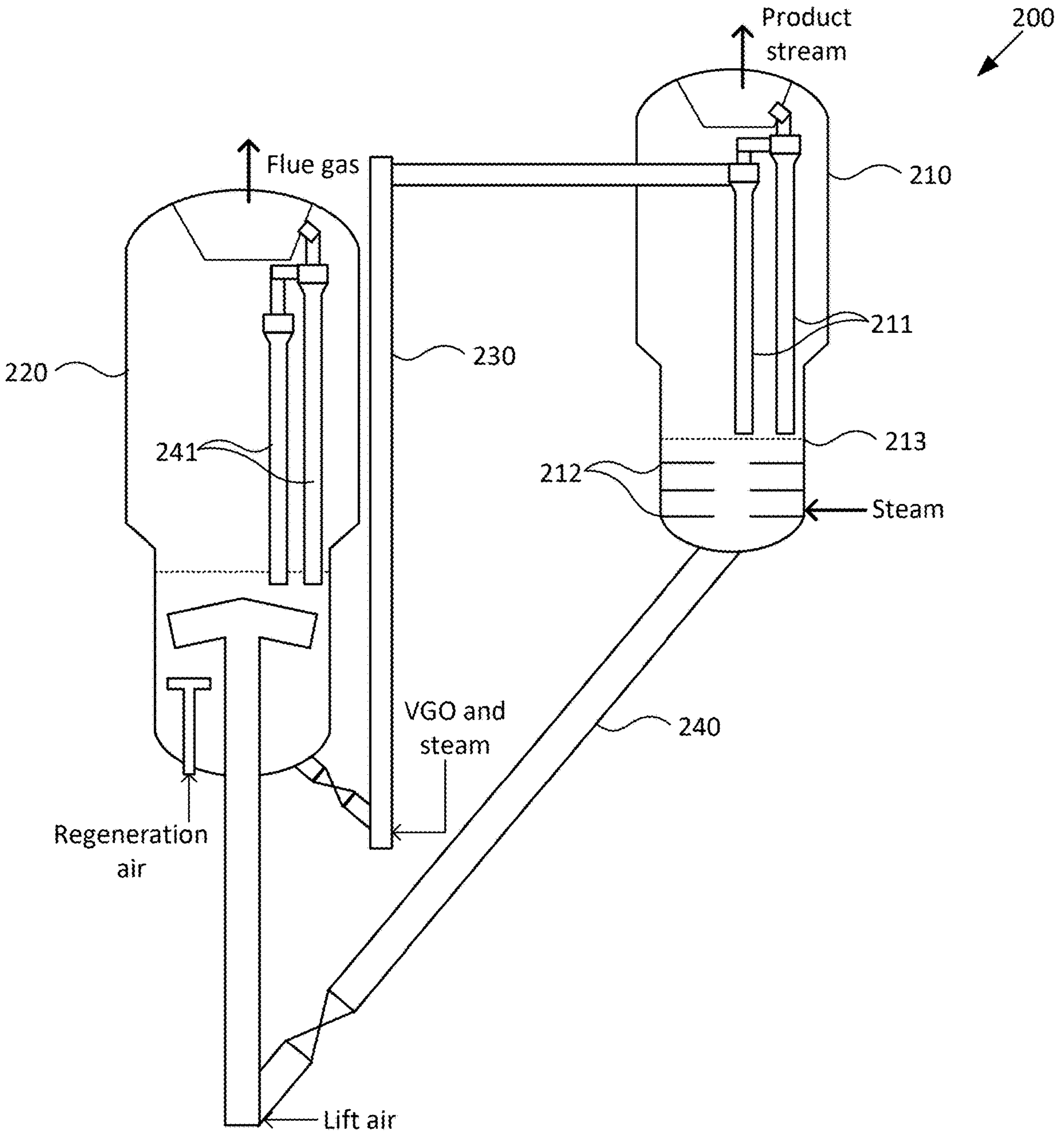
FIG. 2 (PRIOR ART)
FIG. 2 schematically illustrates an example side-by-side fluidized catalytic cracking (FCC) system for hydrocracking vacuum gas oil (VGO).

FIG. 2 schematically illustrates an example side-by-side FCC system 200 for cracking VGO. System 200 includes stripper 210 and regenerator 220 which are coupled to one another in using a riser 230 and spent catalyst standpipe 240. Because the riser is next to stripper 210, this may be referred to as a "side-by-side" configuration. VGO and steam, together with hydrocracking catalyst from regenerator 220, are input to riser 230 and transported in the vapor phase through riser 230 to stripper 210. The VGO includes long-chain hydrocarbon molecules which are in the vapor phase. Within riser 230, the hydrocracking catalyst cracks the VGO into smaller vapor-phase molecules, such as linear alkanes, branched alkanes, cycloalkanes, and branched alkenes. The smaller vapor-phase molecules then may further crack and/or combine to form still smaller linear alkenes and branched alkenes which are in the vapor phase, and which may be suitably captured and optionally condensed for use as fuel, e.g., transportation fuel, or as a feedstock for another process. The reactions within riser 230 to crack the VGO to form the desired products are relatively fast, e.g., about 0.8-2.4 seconds, and are substantially complete by the time the mixture exits riser 230 and enters stripper 210. Additionally, the flow at the exit of riser 230 (which may be coupled directly to cyclone(s) 211) is relatively fast, e.g., about 50-90 ft/second.

Stripper 210 includes cyclone(s) 211 to separate the spent hydrocracking catalyst from the products of the hydrocracking reactions, forming a product stream. As the spent hydrocracking catalyst flows downward through the stripper 210 under the force of gravity and/or gas flow, the stripper 210 may strip residual hydrocarbon off the hydrocracking catalyst, for example using steam and stripping trays 212. Spent catalyst standpipe 240 returns the spent catalyst to regenerator 220. As shown in FIG. 2, lift air may be injected at the bottom of spent catalyst standpipe 240 to flow the spent catalyst upward into regenerator 220. Regenerator 220 may burn off coke, which is formed in riser 230, from the spent catalyst in a stream of air while heating the catalyst. The regenerated catalyst then may flow into riser 230 for reuse.

Figure 3:
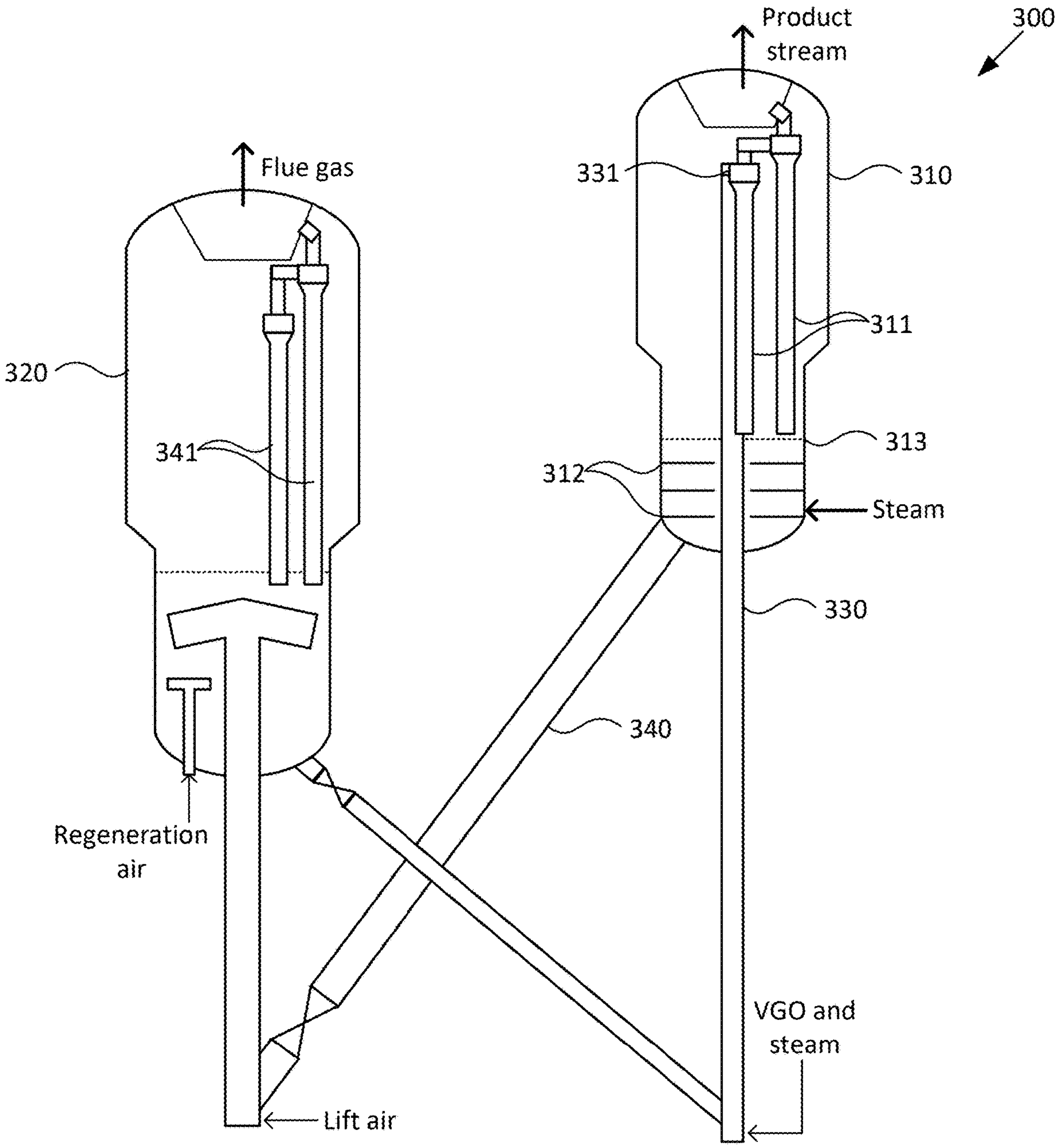
FIG. 3 (PRIOR ART)
FIG. 3 schematically illustrates an example stacked FCC system for hydrocracking VGO.

FIG. 3 schematically illustrates an example stacked FCC system 300 for cracking VGO. System 300 includes stripper 310 and regenerator 320 which are coupled to one another using riser 330 and spent catalyst standpipe 340. Because stripper 310 is stacked over riser 330, this may be referred to as a "stacked" configuration. While riser 230 described with reference to FIG. 2 is primarily located outside of stripper 210, riser 330 illustrated in FIG. 3 is at least partially located inside stripper 310. In a manner similar to that described with reference to system 200, VGO and steam, together with hydrocracking catalyst from regenerator 320, are input to riser 330 and transported in the vapor phase through riser 330 and through stripper 310 to a riser outlet 331 which is coupled to cyclone(s) 311. The reactions within riser 330 to crack the VGO to form the desired products are relatively fast, e.g., about 0.8-2.4 seconds, and are substantially complete by the time the mixture exits riser 330 within stripper 310. Additionally, the flow at the exit 331 of riser 330 is relatively fast, e.g., about 50-90 ft/second.

Stripper 310 similarly includes cyclone(s) 311 to which riser 330 is directly coupled to separate the spent hydrocracking catalyst from the products of the hydrocracking reactions, forming a product stream. As the spent hydrocracking catalyst flows downward through the stripper 310 under the force of gravity and/or gas flow, the stripper 310 may strip residual hydrocarbon off the hydrocracking catalyst, for example using steam and stripping trays 312. Spent catalyst standpipe 340 returns the spent catalyst to regenerator 320, which regenerates the catalyst and returns the regenerated catalyst to riser 330 for reuse in a manner such as described with reference to FIG. 2.

For further details regarding previously known FCC systems, see the following references, the entire contents of each of which are incorporated by reference herein: U.S. Pat. No. 2,451,804 to Campbell et al.; and U.S. Pat. No. 7,594,994 to Seibert et al.

Because the reactions to hydrocrack VGO are completed relatively quickly, FCC systems such as described with reference to FIGS. 2 and 3 were originally designed to complete those reactions within the riser 210 or 310 so that the desired products may be separated from the catalyst immediately after exiting the riser, and the catalyst immediately regenerated and used. Additionally, because catalyst is expensive, FCC systems such as described with reference to FIGS. 2 and 3 may contain relatively low amounts of catalyst. For example, stripper 210 may include catalyst having an upper level in the region denoted 213, and stripper 310 may include catalyst having an upper level in the region denoted 313. Because the catalyst substantially does not perform reactions within stripper 210 or 310 (those reactions being substantially completed within riser 230 or 330), including additional catalyst within the stripper would be wasteful, increasing cost without increasing functionality.

As recognized by the present inventors, simply switching out the VGO for a lipid feedstock, and switching out the hydrocracking catalyst for a lipid feedstock-processing catalyst, in FCC systems such as described with reference to FIGS. 2 and 3 is not expected to successfully result in generation of a renewable fuel intermediate composition. For example, the chemistry to convert a lipid feedstock into a renewable fuel intermediate composition includes many more steps, and much more time, than the chemistry to hydrocrack VGO. The flow rates, component sizes, and other features of the FCC are configured to complete the hydrocracking reaction of VGO in about 2-4 seconds, and essentially entirely within the riser. Because this is only a fraction of the time required to convert a lipid feedstock into a renewable fuel intermediate composition, the yield (if any) of the renewable fuel intermediate composition would be unusably low if the FCC were used at its normal flow rates. Furthermore, simply reducing the flow rates through the FCC in order to lengthen the amount of time for performing the chemical reactions also is not expected to be useful, for example because this may reduce the flow below that which is needed to move the catalyst and feedstock through the FCC, as well as reducing the amount of heat generated, and detrimentally affecting throughput (if any) for generating the renewable fuel intermediate composition.

As recognized by the present inventors, and as now will be explained with reference to FIGS. 4 and 5, certain structural modifications may be made to FCC systems such as described with reference to FIGS. 2 and 3 to repurpose them for commercial use in generating renewable fuel intermediate compositions. In some examples, such structural modifications include replacing the original riser with a riser having significantly expanded diameter that provides a significantly longer contact time between the catalyst and the feedstock before entering the stripper. Additionally, or alternatively, in some examples, such structural modifications include significantly increasing the amount of catalyst within the stripper. That additional catalyst may be used to perform additional reactions within the stripper itself, and as such the modified stripper may be referred to as a "reactor/stripper."

Figure 4:
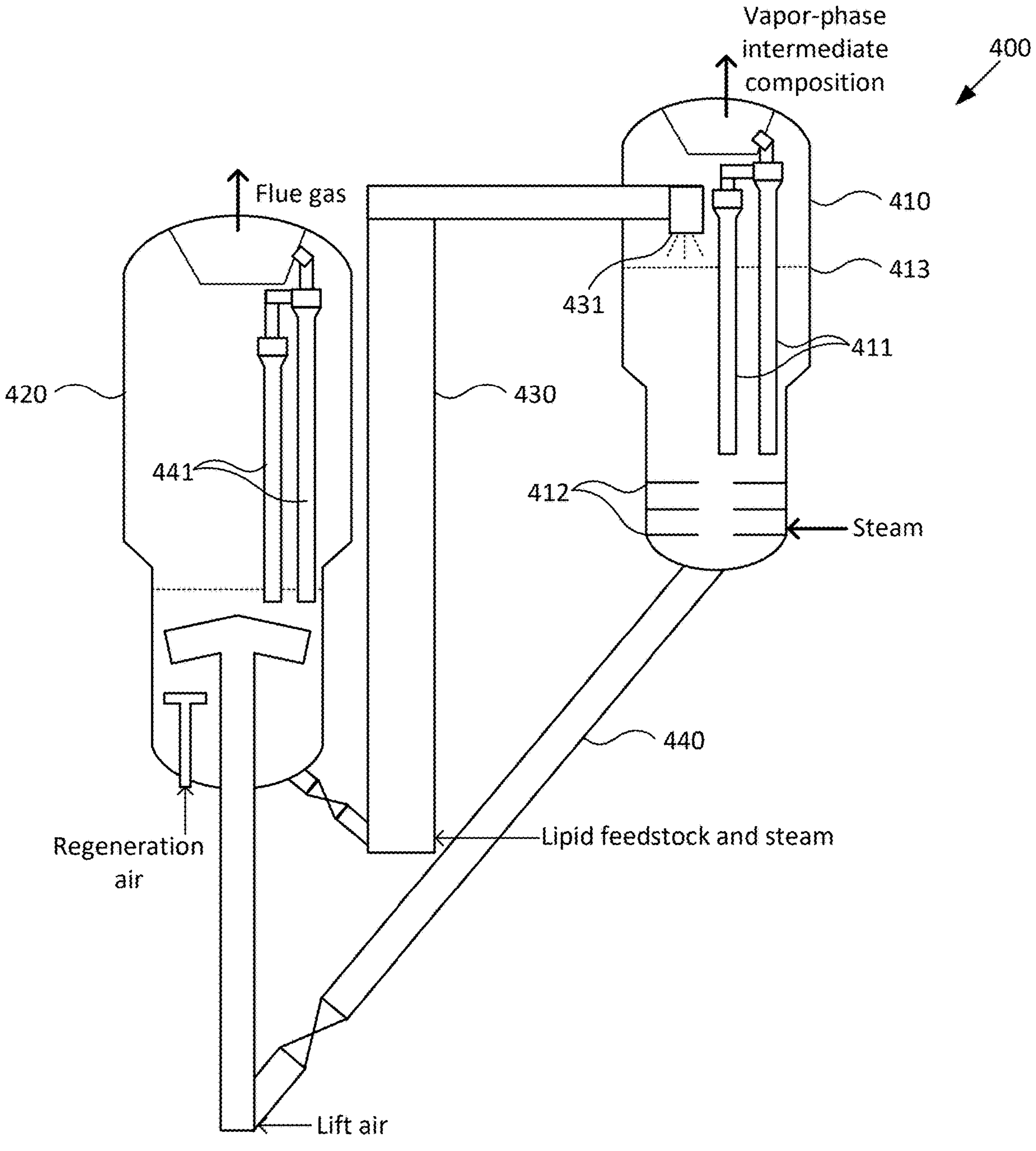
FIG. 4 schematically illustrates the FCC system of FIG. 2 which has been repurposed for generating a renewable fuel intermediate composition, according to some examples herein.

FIG. 4 schematically illustrates the FCC system of FIG. 2 which has been repurposed for generating a renewable fuel intermediate composition, according to some examples herein. In some regards, system 400 is configured similarly as system 200, though certain components of system 400 are modified relative to those in system 200. For example, system 400 includes reactor/stripper 410 and regenerator 420 which are coupled to one another using a riser 430, which is "side-by-side" with reactor stripper 410, and spent catalyst standpipe 440. A renewable lipid feedstock and a particulate catalyst (from regenerator 420) are input to riser 430 where they form a first mixture that flows through riser 430 to reactor/stripper 410. Within riser 430, the lipid feedstock reacts with the particulate catalyst to generate a second mixture that includes (i) catalyst particles to which acidic reaction intermediates are sorbed and (ii) a vapor-phase intermediate composition which is essentially acid free. Nonlimiting examples of such reactions are described above with reference to FIG. 1. The reactions within riser 430 to form acidic reaction intermediates and then to form vapor phase intermediate composition are relatively slow, and are only partially complete by the time the mixture exits riser 430 and enters reactor/stripper 410.

As schematically illustrated in FIG. 4, riser 230 may be replaced with a larger-diameter riser 430. More specifically, the diameter of riser 430 may be increased significantly relative to the diameter of riser 230, so as to significantly extend the residence time of the first mixture in riser 430 as compared to the residence time for which riser 230 was originally designed for cracking VGO over hydrocracking catalyst. Illustratively, the diameter of riser 430 may be selected such that the first mixture is flowed through the riser for about 8 to about 20 seconds, e.g., about 10 to about 14 seconds, e.g., about 12 seconds. As such, riser 430 may have a diameter selected to provide a residence time that is at least about five times greater than that of riser 230, e.g., at least about ten times greater than that of riser 230, for an equivalent flow rate of gases entering the respective risers. Additionally, the diameter of riser 430 may be selected such that the first mixture is flowed through the riser at a rate of about 6 feet/second to about 10 feet/per second, e.g., about 8 to about 9 feet per second. As such, riser 430 may have a diameter selected to provide a flow rate that is at least about five times lower than that of riser 230, e.g., at least about ten times lower than that of riser 230, for an equivalent flow rate of gases entering the respective risers.

FCC system 200 also may be modified to significantly extend the duration for which the catalyst and reaction intermediates react with each other after exiting the riser. For example, in modified system 400 illustrated in FIG. 4, the coupling between riser 430 and reactor/stripper 410 may be modified relative to the original coupling between riser 230 and stripper 210. For example, riser 230 may be coupled directly to cyclone(s) 211 within riser 230 so as to remove spent catalyst from the product steam (which contains the completed product) as quickly as practicable to minimize over cracking and dry gas making. In comparison, the exit 431 of riser 430 instead may eject the second mixture (including particulate catalyst, acidic reaction intermediates sorbed thereto, and vapor-phase intermediate composition, directly into the body of reactor/stripper 410 (instead of directly into cyclone(s) 411). In examples such as illustrated in FIG. 4, the second mixture may be flowed from the riser 430 into the reactor/stripper 410 at a location which is above the bed about 3 ft above the surface of the fluidized bed of the particulate catalyst, e.g., about 1 foot to about 4 feet above, or about 2 feet to about 3 feet above, level 413 illustrated in FIG. 4. The catalyst particles of the second mixture (and to which the acidic reaction intermediates are sorbed) may fall onto the bed of the particulate catalyst. For example, in the nonlimiting configuration shown in FIG. 4, riser 430 may terminate in a downturned pipe outlet 431 that deflects the second mixture downward into reactor/stripper 410, where the flow and/or gravity may draw the particulate catalyst of the second mixture into contact with the additional catalyst in the bed.

As an additional example manner in which FCC system 200 may be modified to significantly extend the duration for which the catalyst and reaction intermediates react with each other after exiting the riser, modified system 400 may include a significantly larger amount of catalyst than does system 200. Illustratively, as shown in FIG. 2, stripper 210 of system 200 may include catalyst having an upper level in the region denoted 213 (around the top of the swage), which is immediately above the stripping trays 212 which are used to strip residual hydrocarbon off the hydrocracking catalyst. During operation of system 200, the inflow of catalyst to stripper 210 via riser 230 may be approximately equal to the outflow of catalyst from stripper 210 via spent catalyst standpipe 240 which returns the spent catalyst to regenerator 220. Because the hydrocracking catalyst substantially does not perform any reactions within stripper 210 (such reactions being substantially completed within riser 230 before the catalyst enters stripper 210), the cost of system 200 is reduced by minimizing the amount of catalyst within stripper 210.

In comparison, as illustrated in FIG. 4, reactor/stripper 410 of modified system 400 may include a fluidized bed of additional catalyst which partially fills reactor/stripper 410 above the stripper section 412, e.g., having an upper level in the region denoted 413. The catalyst within reactor/stripper 410 may be in addition to (and indeed, may be substantially greater in volume than) the catalyst which enters the reactor/stripper 410 via riser 430 during operation. That is, reactor/stripper 410 may be pre-charged with a significant amount of catalyst (to approximately an upper level in the region denoted 413) before startup, so as to maintain approximately that amount of the catalyst within the reactor/stripper 410 during operation, even while the inflow of catalyst to reactor/stripper 410 via riser 430 is approximately equal to the outflow of catalyst from reactor/stripper 410 via spent catalyst standpipe 440 which returns the spent catalyst to regenerator 420. Within the reactor/stripper 410, the acidic reaction intermediates of the second mixture continue to undergo reactions promoted by the particulate catalyst partially filling the stripper. In some examples, the residence time for the particulate catalyst to contact the acidic reaction intermediates in the second mixture to generate additional vapor-phase intermediate composition, is more than about one minute, e.g., more than about 2 minutes, more than about 3 minutes, more than about 4 minutes, or more than about 5 minutes. Illustratively, the residence time may be about 6 minutes to about 16 minutes. In comparison, the originally designed FCC system 200 described may not be considered to have a residence time for reactions within stripper 210, because the reactions are substantially completed within riser 230.

Referring again to FIG. 4, within the body of reactor/stripper 410, the particulate catalyst may further promote reactions of the acidic reaction components sorbed thereto to form additional intermediate composition, e.g., over the course of minutes. In a manner such as described above with reference to FIG. 1, these reactions generate the intermediate composition, which is in the vapor phase and thus removed using cyclone(s) 411. As recognized by the present inventors, because these reactions are significantly slower than the reactions which convert VGO to fuel, using the body of the reactor/stripper 410 (as opposed to solely the riser) to perform reactions, and disposing additional catalyst within the reactor/stripper 410 with which to perform reactions, significantly increases the time over which such reactions may be performed and thus enhances the production of renewable fuel intermediate composition.

Similarly as described with reference to FIG. 2, as the used particulate catalyst flows downward through the reactor/stripper 410 under the force of gravity and/or gas flow, the reactor/stripper 410 may strip residual hydrocarbon off the catalyst, for example using steam and stripping trays 412. Spent catalyst standpipe 440 returns the spent catalyst to regenerator 420. As shown in FIG. 4, lift air may be injected at the bottom of spent catalyst standpipe 440 to flow the spent catalyst upward into regenerator 420. Regenerator 420 may burn off coke, which is formed in riser 430, from the spent catalyst in a stream of air while heating the catalyst. The regenerated catalyst then may flow into riser 430 for reuse.

FCC system 200 may be repurposed for use as system 400 in any suitable manner. Illustratively, riser 430 may be fabricated in a manner similar to that of riser 230, but with significantly greater diameter and a downturned pipe outlet 431 or other suitable distributor. Riser 230 may be removed from system 200, and a suitable foundation built for riser 430 if the foundation for riser 230 is not suitable for use with riser 430. Riser 430 may be set on the foundation, insulated, lined with refractory, and the like. The head may be lifted off of stripper 210 and the internals modified. For example, cyclone(s) 211 may be converted to cyclone(s) 411 by replacing them or by modifying them not to directly receive the second mixture from riser 230. Additionally, the end of riser 430 may be disposed within stripper 210 at a location above where the catalyst bed level 413 will be, e.g., about 1 foot to about 4 feet, or about 2 feet to about 3 feet, above where the catalyst bed level 413 will be. The head of the stripper then may be replaced to form the modified element which now may be referred to as reactor/stripper 410. The reactor/stripper may be partially filled with particulate catalyst, e.g., to the level 413 described with reference to FIG. 4.

It will be appreciated that other FCC configurations suitably may be repurposed for use in generating renewable fuel intermediate compositions. For example, FIG. 5 schematically illustrates the FCC system of FIG. 3 which has been repurposed for generating a renewable fuel intermediate composition, according to some examples herein. In some regards, system 500 is configured similarly as system 300, though certain components of system 500 are modified relative to those in system 300. For example, system 500 includes reactor/stripper 510 and regenerator 520 which are coupled to one another using a riser 530 and spent catalyst standpipe 540, in which the reactor/stripper 510 is “stacked” over the riser 530. Similarly as described with reference to FIG. 4, a renewable lipid feedstock and a particulate catalyst (from regenerator 520) are input to riser 530 where they form a first mixture that flows through riser 530 to reactor/stripper 510. Within riser 530, the lipid feedstock reacts with the particulate catalyst to generate a second mixture that includes (i) catalyst particles to which acidic reaction intermediates are sorbed and (ii) a vapor-phase intermediate composition which is essentially acid free. Nonlimiting examples of such reactions are described above with reference to FIG. 1. The reactions within riser 530 to form acidic reaction intermediates and then form the vapor phase intermediate composition are relatively slow, and are only partially complete by the time the mixture exits riser 530 and enters reactor/stripper 510.

Figure 5:
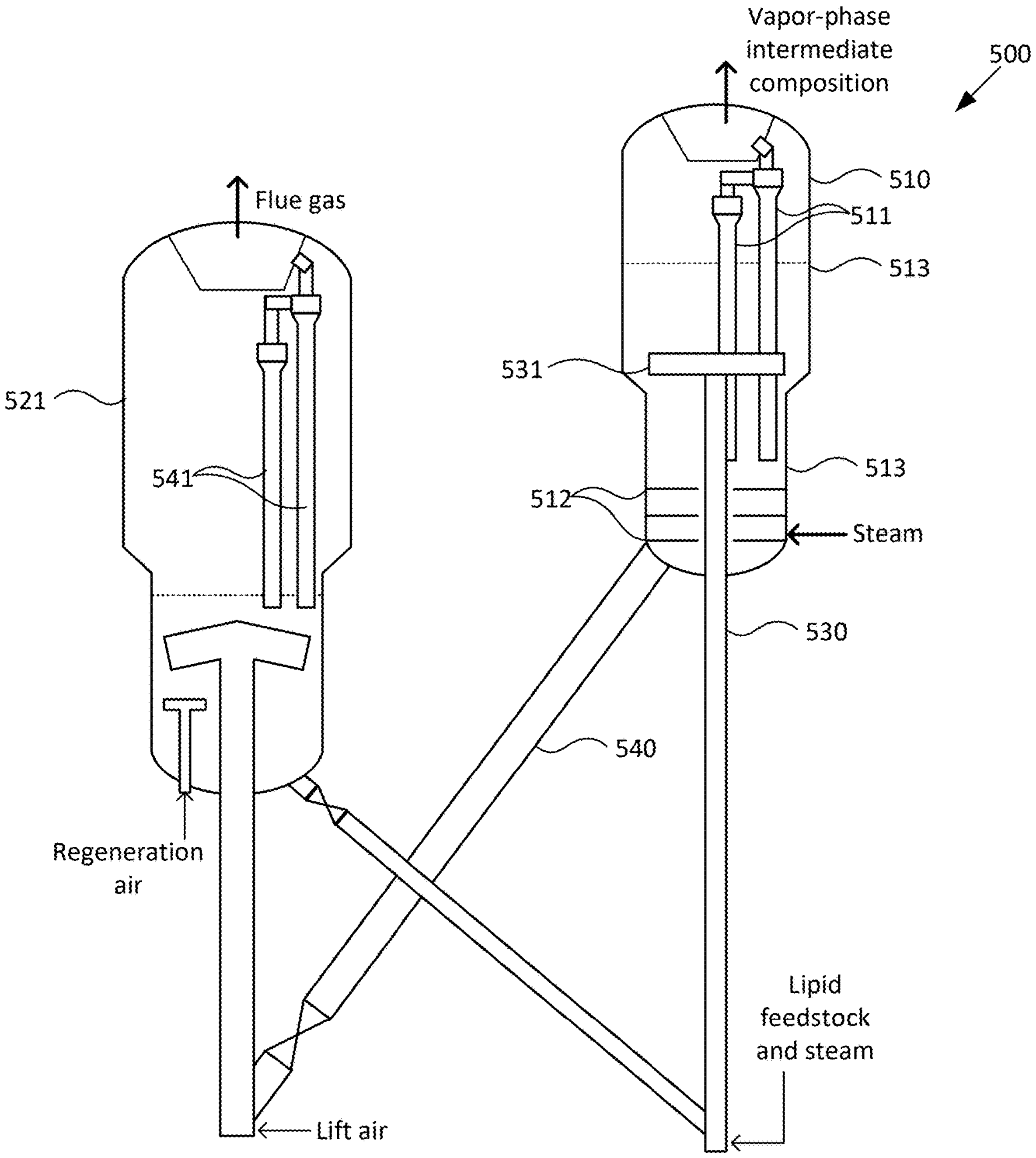
FIG. 5 schematically illustrates the FCC system of FIG. 3 which has been repurposed for generating a renewable fuel intermediate composition, according to some examples herein.

As schematically illustrated in FIG. 5, riser 530 may be shortened relative to riser 330. More specifically, the height of riser 530 may be reduced significantly relative to the height of riser 330, so as to significantly extend the amount of time the second mixture from the distributor 531 of riser 530 resides in reactor/stripper 510 as compared to the residence time (which was essentially nothing) of reactor/stripper 310 for cracking VGO over hydrocracking catalyst. While reducing the height of riser 530 may reduce the residence time within the riser compared to that of riser 330, other modifications may be made to suitably increase the residence time of the second mixture within reactor/stripper 510 and thus offset the reduced residence time within riser 530.

For example, as shown in FIG. 3, stripper 310 of system 300 may include catalyst having an upper level in the region denoted 313 (around the top of the swage), which is immediately above the stripping trays 312 which are used to strip residual hydrocarbon off the hydrocracking catalyst. During operation of system 300, the inflow of catalyst to stripper 310 via riser 330 may be approximately equal to the outflow of catalyst from stripper 310 via spent catalyst standpipe 340 which returns the spent catalyst to regenerator 320. Because the hydrocracking catalyst substantially does not perform any reactions within stripper 310 (such reactions being substantially completed within riser 330 before the catalyst enters stripper 310), the cost of system 300 is reduced by minimizing the amount of catalyst within stripper 310.

In comparison, as illustrated in FIG. 5, reactor/stripper 510 of modified system 500 may include a fluidized bed of additional catalyst which partially fills reactor/stripper 510 above the stripper section 512, e.g., having an upper level in the region denoted 513. The catalyst within reactor/stripper 510 may be in addition to (and indeed, may be substantially greater in volume than) the catalyst which enters the reactor/stripper 510 via riser 530 during operation. That is, reactor/stripper 510 may be pre-charged with a significant amount of catalyst (to approximately an upper level in the region denoted 513) before startup, so as to maintain approximately that amount of the catalyst within the reactor/stripper 510 during operation, even while the inflow of catalyst to reactor/stripper 510 via riser 530 is approximately equal to the outflow of catalyst from reactor/stripper 510 via spent catalyst standpipe 540 which returns the spent catalyst to regenerator 520. Within the reactor/stripper 510, the acidic reaction intermediates the second mixture undergo further reactions promoted by the particulate catalyst partially filling the stripper. In some examples, the residence time for the particulate catalyst to contact the acidic reaction intermediates in the second mixture to generate additional vapor-phase intermediate composition, is more than about one minute, e.g., more than about 3 minutes, more than about 3 minutes, more than about 5 minutes, or more than about 5 minutes. Illustratively, the residence time may be about 6 minutes to about 16 minutes. In comparison, the originally designed FCC system 300 described may not be considered to have a residence time for reactions within stripper 310, because the reactions are substantially completed within riser 330.

FCC system 300 also may be modified to significantly extend the duration for which the catalyst and reaction intermediates react with each other after exiting the riser. For example, in modified system 500 illustrated in FIG. 5, the coupling between riser 530 and reactor/stripper 510 may be modified relative to the original coupling between riser 330 and stripper 310. For example, riser 330 may be coupled directly to cyclone(s) 311 within riser 330 so as to remove spent catalyst from the product stream (which contains the completed product) as quickly as practicable to minimize over cracking and dry gas making. In comparison, riser 530 may include a distributor 531 which is configured to eject the second mixture (including particulate catalyst, acidic reaction intermediates sorbed thereto, and vapor-phase intermediate composition, directly into the body of reactor/stripper 510 (instead of directly into cyclone(s) 511). In examples such as illustrated in FIG. 5, the second mixture may be flowed from the riser 530 into the reactor/stripper 510 at a location which is within the bed of the particulate catalyst, e.g., below level 513 illustrated in FIG. 5. The catalyst particles of the second mixture (and to which the acidic reaction intermediates are sorbed) may become mixed into the bed of the particulate catalyst.

Figure 6A:
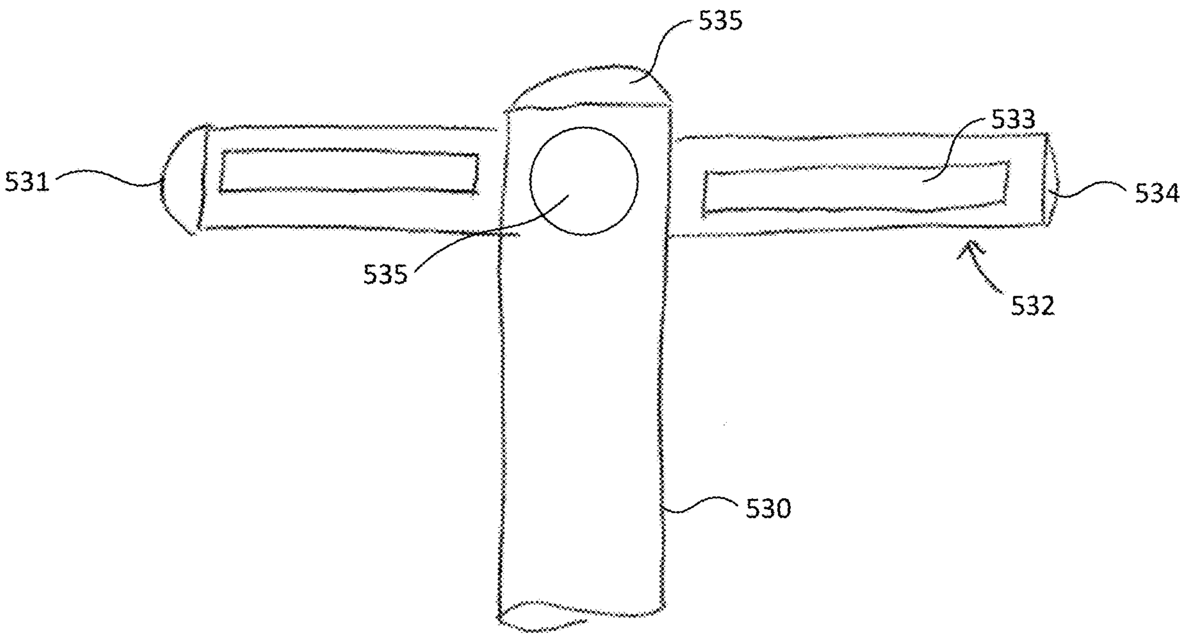
FIGS. 6A-6B schematically illustrate an example distributor that may be disposed within a catalyst bed of the system described with reference to FIG. 5.
Figure 6B:
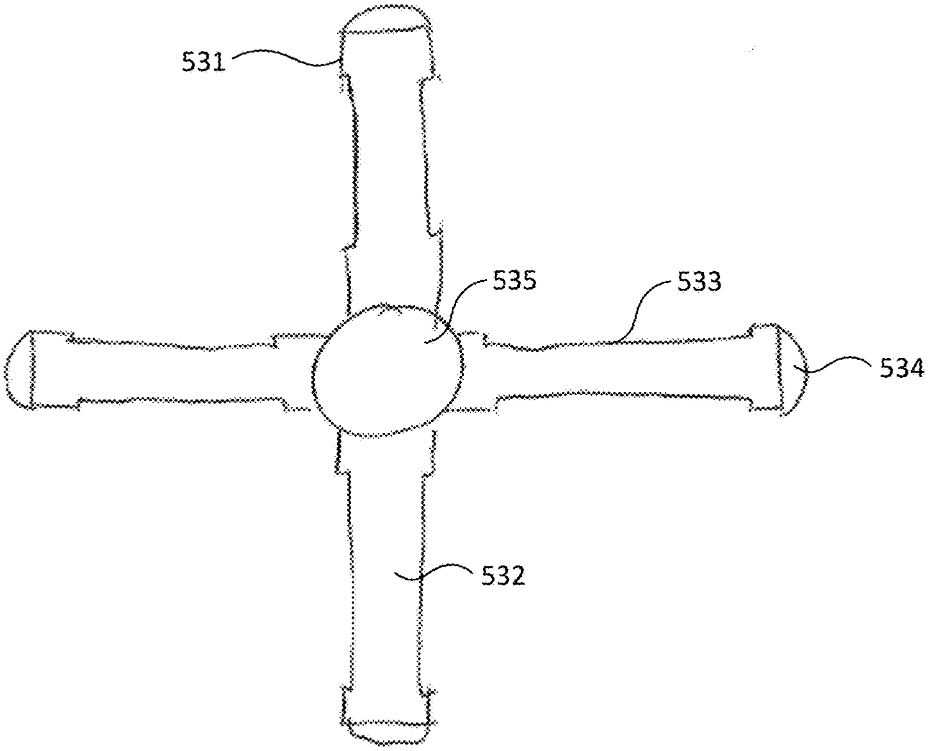

FIGS. 6A-6B schematically illustrate an example distributor 531 that may be disposed within a catalyst bed of the system described with reference to FIG. 5. FIG. 6A illustrates a side view of distributor 531 coupled to riser 530, and FIG. 6B illustrates a top-down view of distributor 531 coupled to riser 530 (riser 530 not specifically shown in FIG. 6B). Distributor 531 may include a plurality of pipes 532 which are coupled to, and extend outwardly from, riser 530. Each pipe 532 may include one or more slots 533 through which the second mixture may be ejected into the catalyst bed of reactor/stripper 510, a first end that is coupled to riser 530, and a second end that is coupled to a cap 534 that inhibits the second mixture from passing laterally therethrough. The top of distributor 531 may include central cap 535 that inhibits the second mixture from passing vertically therethrough.

In the nonlimiting example illustrated in FIGS. 6A-6B, distributor 531 includes four pipes 532 which are spaced at right angles to one another. However, it will be appreciated that distributor 531 may include any suitable number of one or more pipes, e.g., two or more, three or more, four or more, or five or more, and that such pipes may be evenly spaced relative to one another or may be irregularly spaced. In the nonlimiting example illustrated in FIGS. 6A-6B, each pipe 532 includes first and second slots 533 that disposed on opposite sides of the pipe from one another and angled so as to eject the second mixture laterally into the catalyst bed of reactor/stripper 510. However, it will be appreciated that pipe(s) 532 may include any suitable number of slots which are angled so as to eject the second mixture at any desired angle, or combination of angles, into the catalyst bed of reactor/stripper 510. Additionally, in the nonlimiting example illustrated in FIGS. 6A-6B, each slot 533 is illustrated as being rectangular. However, it will be appreciated that slot(s) 533 may have any suitable shape, e.g., circular, oval, triangular, square, rectangular, polygonal, or the like.

Additionally, slots 533 may have the same shape as one another, or may have one or more different shapes than one another.

Referring again to FIG. 5, within the body of reactor/stripper 510, the particulate catalyst may further react with the acidic reaction components sorbed thereto to form additional intermediate composition, e.g., over the course of minutes. In a manner such as described above with reference to FIG. 1, these reactions generate the intermediate composition, which is in the vapor phase and thus removed using cyclone(s) 511. As recognized by the present inventors, because these reactions are significantly slower than the reactions which convert VGO to fuel, using the body of the reactor/stripper 510 (as opposed to solely the riser) to perform reactions, and disposing additional catalyst within the reactor/stripper 510 with which to perform reactions, significantly increases the time over which such reactions may be performed and thus enhances the production of renewable fuel intermediate composition.

Similarly as described with reference to FIG. 3, as the used particulate catalyst flows downward through the reactor/stripper 510 under the force of gravity and/or gas flow, the reactor/stripper 510 may strip residual hydrocarbon off the catalyst, for example using steam and stripping trays 512. Spent catalyst standpipe 540 returns the spent catalyst to regenerator 520. As shown in FIG. 5, lift air may be injected at the bottom of spent catalyst standpipe 540 to flow the spent catalyst upward into regenerator 520. Regenerator 520 may burn off coke, which is formed in riser 530, from the spent catalyst in a stream of air while heating the catalyst. The regenerated catalyst then may flow into riser 530 for reuse.

FCC system 300 may be repurposed for use as system 500 in any suitable manner. Illustratively, the head may be lifted off of stripper 310 and the internals modified. For example, cyclone(s) 311 may be converted to cyclone(s) 511 by replacing them or by modifying them not to directly receive the second mixture from riser 330. Additionally, riser 330 may be cut at a location below where the catalyst bed level 513 will be, and distributor 531 installed. The head of the stripper then may be replaced to form the modified element which now may be referred to as reactor/stripper 510. The reactor/stripper may be partially filled with particulate catalyst, e.g., to the level 513 described with reference to FIG. 5.

Figure 7:
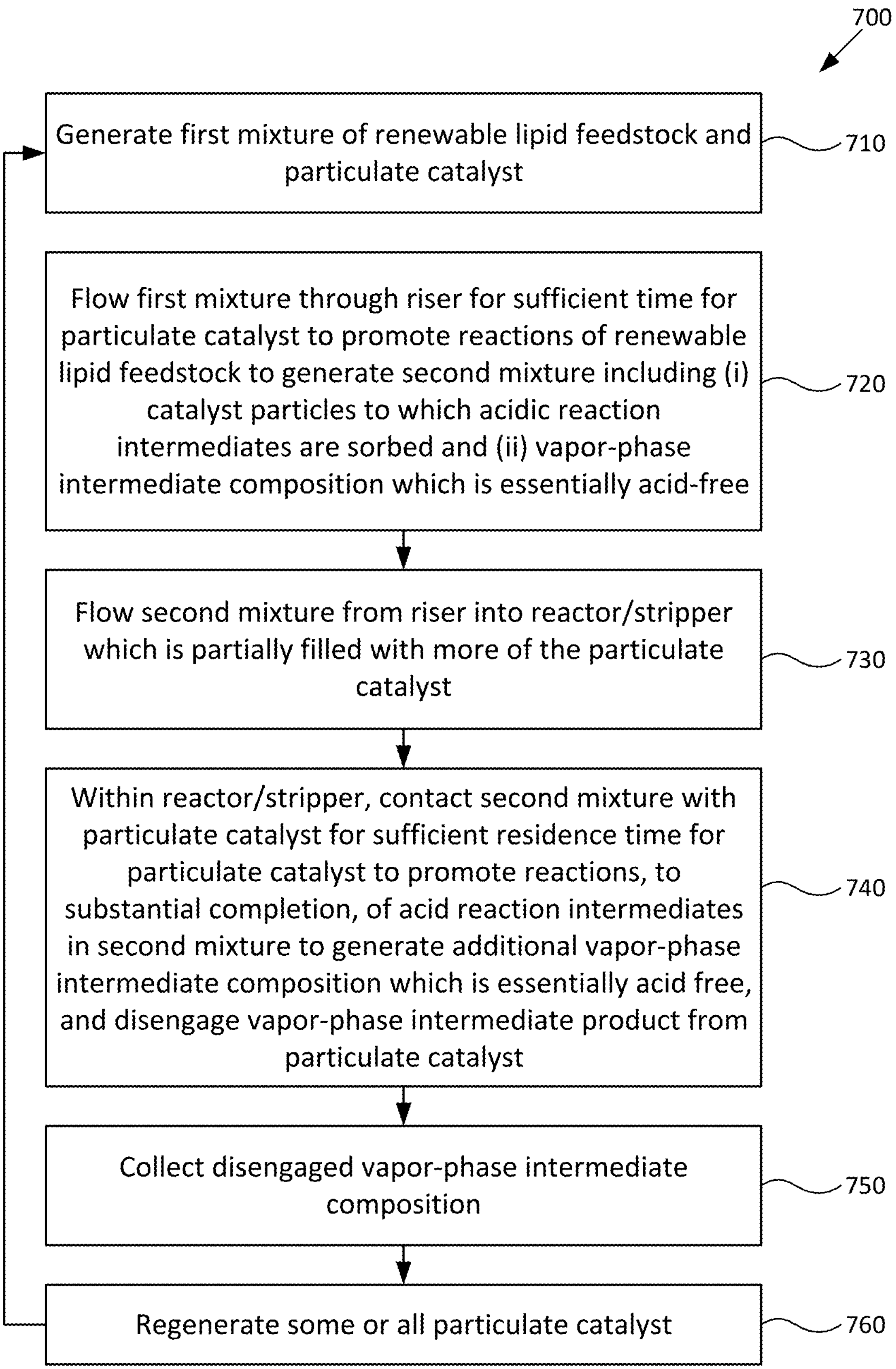
FIG. 7 illustrates an example flow of operations in a method for repurposing an FCC system for generating a renewable fuel intermediate composition.

FIG. 7 illustrates an example flow of operations in a method for repurposing an FCC system for generating a renewable fuel intermediate composition. Method 700 illustrated in FIG. 7 may include generating a first mixture of a renewable lipid feedstock and a particulate catalyst (operation 710). In some examples, the first mixture may be generated within a riser. For example, in a manner such as described with reference to FIG. 1, the lipid feedstock 121 and catalyst 122 may be input to riser 111. Nonlimiting example configurations of riser 111 are described with reference to riser 430 of FIG. 4 and riser 530. In other examples, the first mixture may be generated outside of a riser.

In some examples, the particulate catalyst includes any suitable metal oxide catalyst on an oxide support. In some examples, the metal oxide catalyst includes at least one metal selected from the group consisting of Na, K, Mg, Ca, Sr, and a rare earth metal. Illustratively, the metal oxide catalyst may include at least one metal selected from the group consisting of Na, K, Ca, and Mg. In some examples, the metal of the metal oxide catalyst may be an alkali metal such as lithium, sodium, or potassium. In some examples, the metal of the metal oxide catalyst may be an alkaline earth metal such as magnesium, strontium, or calcium. In one nonlimiting example, the metal oxide catalyst may include calcium oxide, and in some examples may consist essentially of calcium oxide, or may consist of calcium oxide. The calcium within the calcium oxide catalyst may be in oxidation state 2 (as in CaO), but it may be in any suitable chemical form and is not limited to exclusively CaO. Additionally, the chemistry of the calcium oxide catalyst may change over time and/or with exposure to the lipid feedstock. For example, the calcium oxide catalyst initially may be in the form of CaO, CaO(OH), or $Ca(OH)_2$, or a mixture thereof. In operation, the calcium may be in the form of a mixture of any such compounds and/or in the form of carbonate or carboxylate. Additionally, or alternatively, the calcium may become partially embedded in the oxide support as aluminate, e.g., oxy-aluminate and/or hydroxy-aluminates. The metal oxide catalyst may be supported on any suitable oxide support, such as alumina. In some examples, the lipid feedstock is mixed with substantially no other solid-state materials besides the metal oxide catalyst (e.g., calcium oxide catalyst or other alkaline earth metal oxide catalyst) on the oxide support (e.g., alumina).

In some examples, the particulate catalyst, e.g., metal oxide catalyst on the oxide support, includes particles with sizes in the range of about 0.01 mm to about 5 mm. Illustratively, the particulate catalyst may include (or in some cases may consist essentially of) particles with sizes in the range of about 0.05 mm to about 0.15 mm, or may include (or in some cases may consist essentially of) particles with sizes in the range of about 0.05 mm to about 0.15 mm.

The particulate catalyst, e.g., metal oxide catalyst on the oxide support, additionally, or alternatively, may have any suitable combination of properties, e.g., bulk density, particle density, packed density, pore volume, large pore content, average pore diameter, and/or surface area. Illustratively, the metal oxide catalyst may have one or more of the following properties, or any suitable combination of two or more of the following properties: a bulk density in the range of about 0.78 kg/l to about 0.86 kg/l; a particle density in the range of about 1.2 kg/l to about 1.4 kg/l; a packed density in the range of about 0.8 g/cc to about 1.0 g/cc; a pore volume in the range of about 0.42 to about 0.48 cc/g; a large pore content (pores >1000 Å) of about 0.30 cc/g to about 0.38 cc/g; an average pore diameter (D50) of about 100 Å to about 200 Å; and/or a surface area of about 50 $m^2/g$ to about 300 $m^2/g$. Additionally, or alternatively, the metal oxide catalyst may have one or more of the following properties, or any suitable combination of two or more of the following properties: a bulk density in the range of about 0.80 kg/l to about 0.84 kg/l; a particle density in the range of about 1.1 kg/l to about 1.3 kg/l; a packed density in the range of about 0.85 g/cc to about 0.95 g/cc; a pore volume in the range of about 0.44 to about 0.46 cc/g; a large pore content (pores >1000 Å) of about 0.33 cc/g to about 0.36 cc/g; an average pore diameter (D50) of about 130 Å to about 160 Å; and/or a surface area of about 80 $m^2/g$ to about 120 $m^2/g$.

In some examples, the first mixture includes steam to inhibit cracking and coke formation. In some examples, the steam is provided in an amount of about 0 wt % to about 50 wt %, and its use is optional. In some examples, the first mixture includes substantially only steam, the lipid feedstock, and the particulate catalyst. That is, hydrogen may not be separately input as a reactant. Additionally, the steam may not be a reactant in the reactions between the lipid feedstock and the particulate catalyst, e.g., may not be a source of hydrogen for such reactions.

Referring again to FIG. 7, method 700 further may include flowing the first mixture through a riser for a sufficient time for the particulate catalyst to promote reactions of the renewable lipid feedstock to generate a second mixture including (i) catalyst particles to which acidic reaction intermediates are sorbed and (ii) vapor-phase intermediate composition which is essentially acid free (operation 720). The lipid feedstock and the particulate catalyst may be contacted with one another in the riser under any suitable combination of reaction conditions to generate the intermediate composition. In various examples, the portion of the catalytic conversion within the riser may be performed at a temperature of about 400° C. to about 700° C., illustratively about 425° C. to about 600° C., e.g., about 450° C. to about 550° C., e.g., about 475° C. to about 500° C. Additionally, in some examples, the catalytic conversion may be performed at a pressure in the range of about 0.01 MPa to about 10 Mpa, illustratively about 0.1 to about 5 Mpa, e.g., about 0.1 to about 1 Mpa, or, e.g., about 0.05 MPa to about 0.5 MPa, or about 0.01 MPa to about 0.1 MPa. Nonlimiting examples of flow rates and residence times within the riser are provided above with reference to FIGS. 4 and 5.

Referring again to FIG. 7, method 700 further may include flowing the second mixture from the riser into a reactor/stripper which is partially filled with more of the particulate catalyst (operation 730). In nonlimiting examples such as described with reference to FIG. 4, the riser may include an outlet which is above (e.g., about 1 foot to about 4 feet above, or about 2 feet to about 3 feet above) a level of the particulate catalyst within the reactor/stripper. In nonlimiting examples such as described with reference to FIG. 5, the riser may include an outlet which is below a level of the particulate catalyst within the reactor/stripper.

Referring again to FIG. 7, method 700 further may include, within the reactor/stripper contacting the second mixture with the particulate catalyst for a sufficient residence time for the particulate catalyst to promote reactions, to substantial completeness, of acidic reaction intermediates in the second mixture to generate additional vapor-phase intermediate composition which is essentially acid free, and disengaging the vapor-phase intermediate composition from the particulate catalyst (operation 740). The second mixture may undergo reactions in the riser under any suitable combination of reaction conditions to generate the intermediate composition. In various examples, the portion of the catalytic conversion within the riser may be performed at a temperature of about 400° C. to about 700° C., illustratively about 425° C. to about 600° C., e.g., about 450° C. to about 550° C., e.g., about 475° C. to about 500° C. Additionally, in some examples, the catalytic conversion may be performed at a pressure in the range of about 0.01 MPa to about 10 MPa, illustratively about 0.1 to about 5 MPa, e.g., about 0.1 to about 1 MPa, or, e.g., about 0.05 MPa to about 0.5 MPa, or about 0.01 MPa to about 0.1 MPa. Nonlimiting examples of flow rates and residence times within the reactor/stripper are provided above with reference to FIGS. 4 and 5.

The reaction(s) performed using the particulate catalyst, e.g., metal oxide catalyst on oxide support, may reduce the amount of oxygen in the lipid feedstock. For example, the intermediate composition may include less than about 70 wt % of an amount of oxygen in the lipid feedstock. Additionally, the reaction(s) performed using the metal oxide catalyst may modify the location(s) of oxygen within the molecules being reacted. For example, at least about 80 wt % of the oxygen in the liquid portion of the intermediate composition may be within ketone groups. In comparison, in some examples, the lipid feedstock substantially may not include any ketone groups. Because the intermediate composition is vapor-phase at the reaction conditions within the reactor/stripper, it disengages from the particulate catalyst which is solid-phase.

Additionally, as discovered by the present inventors, the present catalytic conversion may remove multiple contaminants, thus rendering the intermediate composition safe to bring into contact with subsequent catalysts for use in generating a renewable fuel. In some examples, the intermediate composition lacks a detectable amount of metal. In some examples, the intermediate composition lacks a detectable amount of phosphorous. In some examples, intermediate composition lacks a detectable amount of chlorine. The amount (if any) of metal, phosphorous, and/or certain other contaminants may be measured in any suitable manner, such as inductively coupled plasma-mass spectrometry (ICP). In some examples, an organic chloride contaminant level can be determined by X-ray Fluorescence Spectroscopy, e.g., ASTM D7536-09, Standard Test Method for Chlorine in Aromatics by Monochromatic Wavelength Dispersive X-ray Fluorescence Spectrometry. In other examples, chlorine content may be determined using combustion ion chromatography (CIC), a technique in which a sample is burned in an oxygen-containing gas flow, the gas generated (including halogen ions) is absorbed by a solution, and then the halogen content of the solution is quantitatively analyzed using ion chromatography. Additionally, or alternatively, in some examples, chlorine content may be determined using X-ray fluorescence to determine chloride content with a detection limit of about 1 ppm.

When it is described herein that a composition "lacks a detectable amount" of an element, it means that the amount of that element in the composition is approximately at or below than the measurement threshold of the respective instrument being used to measure that element. Of course, different instruments may have different measurement thresholds than one another. In some examples, the instrument has a measurement threshold of about 5 ppm, and the intermediate composition has a concentration of less than about 5 ppm of metal, phosphorous, and/or chlorine. In some examples, the instrument has a measurement threshold of about 1 ppm, and the intermediate composition has a concentration of less than about 1 ppm of metal, phosphorous, and/or chlorine. In other examples, the instrument has a measurement threshold of about 0.5 ppm, and the intermediate composition has a concentration of less than about 0.5 ppm of metal, phosphorous, and/or chlorine. In still other examples, the instrument has a measurement threshold of about 0.1 ppm, and the intermediate composition has a concentration of less than about 0.1 ppm of metal, phosphorous, and/or chlorine.

As illustrated in FIG. 7, the disengaged vapor-phase intermediate composition may be collected (operation 750). Illustratively, cyclone(s) or other suitable mechanism(s) known in the art may be used to collect the intermediate composition. Additionally, some or all of the particulate catalyst may be regenerated (operation 760), for example using regenerator 113, 420, or 520. The regenerated particulate catalyst then may be used to perform operations 710 through 760 for any suitable number of times.

Further details regarding the intermediate composition now will be provided.

In some examples, the intermediate composition includes a mixture of organic compounds primarily having a boiling point above about 150° C. The renewable fuel intermediate composition may be stored and/or may be further processed in any suitable manner to form a final product (e.g., renewable fuel). Illustratively, method 700 illustrated in FIG. 7 further may include hydroprocessing a fraction of the intermediate composition to aviation fuel. Additionally, or alternatively, method 700 illustrated in FIG. 7 further may include hydroprocessing a fraction of the intermediate composition to renewable diesel fuel. Additionally, or alternatively, method 700 illustrated in FIG. 7 further may include hydroprocessing a fraction of the intermediate composition to renewable naphtha. Additionally, or alternatively, method 700 illustrated in FIG. 7 further may include hydroprocessing a fraction of the intermediate composition to renewable gasoline.

Previously known approaches to hydrotreating lipids typically produce a majority of hydrocarbons in the diesel fuel range with very little in the jet fuel range. However, it has been further discovered that the present systems and methods may be used to produce a renewable fuel intermediate composition that is surprisingly lighter and richer in components in the jet fuel range. Without being bound by a particular theory, it is believed that in the present systems and methods, heavier components of the intermediate composition that have a boiling point that is too high for evaporation under the conditions in the reactor/stripper tend to remain in the liquid phase in the reactor/stripper until they convert further into lighter products that evaporate in the reactor/stripper and are carried out of the reactor/stripper in the vapor phase. It is further understood the present systems and methods restructure the carbon chains in the fatty acids of the lipids. In some examples, the intermediate composition is or includes a mixture of essentially non-acidic hydrocarbons and oxygenates, primarily ketones, with chain lengths varying from significantly shorter than the original fatty acid chain length to considerably longer than the original fatty acid chain length. This phenomenon yields a renewable fuel intermediate composition that is particularly useful for producing fuel range products, particularly products in the aviation fuel range.

In some examples, the intermediate composition exiting the reactor/stripper may be separated into the following components: 1) renewable fuel gas including (and, in some examples, consisting essentially of) C1 and C2 hydrocarbons with a boiling point range of about 0° C. to about 20° C., 2) a renewable liquefied petroleum gas (LPG) including (and, in some examples, consisting essentially of) C3 and C4 hydrocarbons with a boiling point range of about 20° C. to about 150° C., 3) a renewable intermediate transportation fuel including (and, in some examples, consisting essentially of) hydrocarbons in the range of C5 to C20 with a boiling point range of about 150° C. to about 360° C., and 4) a heavy ends product including (and, in some examples, consisting essentially of) hydrocarbons in the range of C21 to C35 with a boiling point range of about 360° C. to about 490° C. Such separation may be performed, for example, using distillation in a manner such as known in the art.

In some examples, such separation may be used to obtain a liquid portion of the renewable fuel intermediate composition having the following characteristics:

(1) naphtha (boiling point of about 20° C. to about 150° C.) of greater than 10 wt % and less than about 30 wt % in the intermediate composition;

(2) intermediate transportation fuel (boiling point of about 150° C. to about 360° C.) of greater than about 40 wt % and less than about 60 wt % in the intermediate composition; and (3) heavy ends product (boiling point of about 360° C. to about 490° C.) of less than about 30 wt % in the intermediate composition.

In some examples, the liquid portion of the renewable fuel intermediate composition may be further characterized as having greater than 90% of its carbon content being renewable carbon of biological (as opposed to fossil/mineral) origin as measured by standard C14 radiocarbon analysis.

In some examples, the liquid portion of the renewable fuel intermediate composition may be further, or alternatively, characterized as having an oxygen content in the range of 1-4 wt %.

In some examples, the liquid portion of the renewable fuel intermediate composition can be further, or alternatively, characterized as having an NMR branching index of greater than about 14%, wherein the NMR branching index is defined as the integral of the protons in the methyl region of 0.5 to 0.95 ppm as a percentage of the integral of the entire aliphatic proton resonances region of 0.5 to 2.1 ppm.

In some examples, the liquid portion of the renewable fuel intermediate composition may be further, or alternatively, characterized as having about 10 wt % to about 50 wt % of oxygen containing molecules and/or at least about 50 wt % of oxygen-free hydrocarbons.

In some examples, the liquid portion of the renewable fuel intermediate composition can be further, or alternatively, characterized as having more than about 80 wt % of the oxygen in the product being in the form of ketone groups. Additionally, or alternatively, in some examples, the liquid portion of the renewable fuel intermediate composition may be characterized as having and at least about 10 wt % of the oxygen in the form of methyl ketones (Me-C(O)—R).

In some examples, the liquid portion of the renewable fuel intermediate composition can be further, or alternatively, characterized as having a total acid number (TAN) of less than 1.

In one nonlimiting example, an intermediate aviation fuel portion of the liquid renewable fuel intermediate composition that is suitable for further processing into aviation fuel (e.g., jet fuel) may be characterized as:

(1) having greater than 90% of its carbon content being renewable carbon of biological (as opposed to fossil/mineral) origin as measured by standard C14 radiocarbon analysis;

(2) having a freezing point of less than about −15° C.;

(3) having less than about 10 wt % of its content including acyclic isoalkanes; and (4) having greater than about 15 wt %, (e.g., greater than about 20 wt %, or greater than about 30 wt %) of its content being saturated hydrocarbons with one or two rings (i.e., cycloalkanes).

In some examples, the intermediate aviation fuel portion can be further, or alternatively, characterized as a composition in which the fraction of saturated hydrocarbons with one or two rings is at least twice the fraction of saturated acyclic hydrocarbons (i.e., traditional isoalkanes).

In some examples, the intermediate aviation fuel portion can be further characterized as a composition in which the fraction of saturated hydrocarbons with one or two rings is larger than the fraction of saturated acyclic hydrocarbons (i.e., traditional isoalkanes).

As noted above, transportation fuels have to meet certain specifications. The cold flow properties of transportation fuels may be particularly challenging when making renewable fuels from lipid feedstock. For example, lipids may include linear molecular components which, in previously known methods, tend to hydrotreat to predominantly linear products, which may have relatively high pour, cloud, and freeze points. Consequently, renewable fuels produced using previously known methods may need extensive isomerization/isodewaxing to meet the cold flow property specification. The specifications for aviation fuels, in particular, have a relatively low freeze point (i.e., −40° C. for Jet A, −47° C. for Jet A-1, and −60° C. for Jet B).

In some examples, intermediate compositions made using the present systems and methods may be used to produce a hydrotreated renewable fuel composition that is suitable for use as transportation fuel (particularly jet fuel, such as Jet A or Jet A-1). For example, it is expected that when the renewable fuel intermediate composition is hydrogenated, the jet fuel range fraction of the hydrogenated product will have a suitable freezing point. In one nonlimiting example, the hydrotreated renewable fuel composition may be characterized as having:

(1) a carbon content of which at least about 90% is derived from biological origin as determined by carbon-14 presence;

(2) a bromine index less than about 1000;

(3) an oxygen content less than about 1 wt %; and (4) a cycloalkane content having one or two rings, the cycloalkane content including greater than 15 wt %.

In some examples, the hydrotreated renewable fuel composition may be further, or alternatively, characterized as having a jet fuel component that has a freezing point less than about −15° C., or less than about −20° C., or less than about −30° C., or less than about −40° C., or about −40° C., or about −47° C.

In some examples, the hydrotreated renewable fuel composition may be further, or alternatively, characterized as having an n-alkane content of less than about 70 wt %, or less than about 60 wt %.

In some examples, the hydrotreated renewable fuel composition may be further, or alternatively, characterized as having an acyclic isoalkane content of less than about 15 wt %.

In some examples, the hydrotreated renewable fuel composition may be further, or alternatively, characterized as having a cycloalkane content that is at least about twice an acyclic isoalkane content as measured by weight percent of the hydrotreated renewable fuel composition.

In some examples, The hydrotreated renewable fuel composition may be further, or alternatively, characterized as having mono-aromatic components greater than about 2 wt % and less than about 15 wt %.

Additional examples of the renewable fuel intermediate composition will be elucidated below with reference to example data which demonstrates that the present systems and methods may be used to generate intermediate compositions from lipid feedstocks.

ADDITIONAL COMMENTS

While various illustrative embodiments of the invention are described above, it will be apparent to one skilled in the art that various changes and modifications can be made therein without departing from the invention. The appended claims are intended to cover all such changes and modifications that fall within the true spirit and scope of the invention.

What is claimed is:

1. A method of repurposing a fluid catalytic cracking (FCC) system originally designed for cracking vacuum gas oil (VGO), the method comprising:

generating a first mixture of a renewable lipid feedstock, steam, and a particulate catalyst, wherein the particulate catalyst comprises a metal oxide catalyst on an oxide support;

flowing the first mixture through a riser for a sufficient time for the particulate catalyst to promote reactions of the renewable lipid feedstock to generate a second mixture comprising (i) catalyst particles to which acidic reaction intermediates are sorbed and (ii) a vapor-phase intermediate composition which is essentially acid free, wherein the reaction within the riser is performed at a temperature of about 400° C. to about 700° C.;

flowing the second mixture from the riser into a reactor/stripper which is partially filled with more of the particulate catalyst;

within the reactor/stripper:

contacting the second mixture with the particulate catalyst for a sufficient residence time for the particulate catalyst to promote reactions, to substantial completeness, of the acidic reaction intermediates in the second mixture to generate additional vapor-phase intermediate composition which is essentially acid free; and disengaging the vapor-phase intermediate composition from the particulate catalyst;

collecting the disengaged vapor-phase intermediate composition;

regenerating in a regenerator some or all of the used particulate catalyst from the reactor/stripper; and recycling the regenerated particulate catalyst into contact with additional renewable lipid feedstock in the riser, wherein the renewable lipid feedstock and the steam are substantially the only inputs to the FCC system for reactions which are catalyzed by the particulate catalyst, and wherein the renewable lipid feedstock is substantially the only feedstock input to the FCC system.

2. The method of claim 1, in which the disengaging of the vapor-phase intermediate composition from the particulate catalyst is accomplished using one or more cyclones.

3. The method of claim 1, wherein the acidic reaction intermediates in the second mixture comprise fatty acids, carboxylates, or a mixture of fatty acids and carboxylates.

4. The method of claim 1, wherein the vapor-phase intermediate composition has a total acid number (TAN) of less than about 5.

5. The method of claim 1, wherein the acidic reaction intermediates in the second mixture are sorbed to the particulate catalyst via one or more of adsorption, chemisorption, and absorption.

6. The method of claim 1, wherein the first mixture is flowed through the riser at a rate of about 6 feet/second to about 10 feet/second.

7. The method of claim 1, wherein the vapor-phase intermediate composition comprises ketone groups.

8. The method of claim 7, wherein more than about 70 wt % of oxygen in the vapor-phase intermediate composition is in the ketone groups.

9. The method of claim 1, wherein, within the reactor/stripper, the particulate catalyst of the second mixture and with the particulate catalyst partially filling the reactor/stripper promote the reactions of the acidic reaction intermediates.

10. The method of claim 1, wherein the residence time is about 6 minutes to about 16 minutes.

11. The method of claim 1, wherein the particulate catalyst partially filling the reactor/stripper is located within a fluidized bed.

12. The method of claim 11, wherein the second mixture is flowed from the riser into the reactor/stripper at a location which is above the fluidized bed of the particulate catalyst, or wherein the second mixture is flowed from the riser into the reactor/stripper at a location which is within the fluidized bed of the particulate catalyst.

13. The method of claim 11, wherein the catalyst particles to which the acidic reaction intermediates are sorbed fall onto the fluidized bed of the particulate catalyst, or wherein the catalyst particles to which the acidic reaction intermediates are sorbed are distributed through the fluidized bed of the particulate catalyst.

14. The method of claim 1, wherein the riser and reactor/stripper are side-by-side, or wherein the reactor/stripper is stacked above the riser.

15. The method of claim 14, wherein the riser comprises a downturned outlet, or wherein the riser is shortened relative to the original riser in the FCC system.

16. The method of claim 1, wherein the metal oxide catalyst comprises at least one metal selected from the group consisting of Na, K, Mg, Ca, and Sr.

17. The method of claim 1, wherein the metal oxide catalyst comprises calcium oxide.

18. The method of claim 1, wherein the oxide support comprises alumina.

19. The method of claim 1, wherein the first mixture consists essentially of the renewable lipid feedstock, the steam, the particulate catalyst, and inert gases.

* * * * *